(12) United States Patent
Schermerhorn et al.

(10) Patent No.: US 10,493,901 B2
(45) Date of Patent: Dec. 3, 2019

(54) LIGHT ASSEMBLY FOR ATTACHMENT TO A SURFACE OF A VEHICLE

(71) Applicant: MILWAUKEE ELECTRIC TOOL CORPORATION, Brookfield, WI (US)

(72) Inventors: Joshua Schermerhorn, Wauwatosa, WI (US); David Proeber, Milwaukee, WI (US); Josh Adams, Milwaukee, WI (US); Duane W. Wenzel, Waukesha, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 16/140,682

(22) Filed: Sep. 25, 2018

(65) Prior Publication Data
US 2019/0092225 A1    Mar. 28, 2019

Related U.S. Application Data

(60) Provisional application No. 62/727,303, filed on Sep. 5, 2018, provisional application No. 62/562,897, filed on Sep. 25, 2017.

(51) Int. Cl.
*B60Q 1/24* (2006.01)
*B60Q 1/04* (2006.01)
*B60Q 3/35* (2017.01)
*F21L 14/00* (2006.01)
*F21V 21/14* (2006.01)
(Continued)

(52) U.S. Cl.
CPC ............ *B60Q 1/24* (2013.01); *B60Q 1/0483* (2013.01); *B60Q 1/068* (2013.01); *B60Q 3/35* (2017.02); *F21L 14/00* (2013.01); *F21V 21/145* (2013.01); *F21V 21/30* (2013.01); *F21V 14/025* (2013.01); *F21W 2131/1005* (2013.01); *F21Y 2103/10* (2016.08); *F21Y 2115/10* (2016.08)

(58) Field of Classification Search
CPC .......... B60Q 1/24; B60Q 1/0483; B60Q 3/35; F21V 21/145; F21V 21/30
See application file for complete search history.

(56) References Cited

U.S. PATENT DOCUMENTS

| 1,687,651 A | 10/1928 | Anderson |
| 3,278,741 A | 10/1966 | Wood |

(Continued)

FOREIGN PATENT DOCUMENTS

DE    202015106951    11/2016

*Primary Examiner* — Joseph L Williams
(74) *Attorney, Agent, or Firm* — Michael Best & Friedrich LLP

(57) ABSTRACT

A light assembly attaches to a surface of a vehicle with a power source. The light assembly includes a light head including a light, a light head terminal in electrical communication with the light, and a first mounting structure. The light assembly further includes a first base configured to be coupled to the surface of the vehicle. The first base includes a second mounting structure configured to mate with the first mounting structure. The first base also includes a conductor configured to couple to the power source of the vehicle and a first base terminal in electrical communication with the conductor. The light assembly further includes a second base configured to be coupled to the surface of the vehicle. The second base includes a third mounting structure configured to mate with the first mounting structure and a battery and a second base terminal in electrical communication with the battery.

20 Claims, 31 Drawing Sheets

(51) Int. Cl.
*F21V 21/30* (2006.01)
*B60Q 1/068* (2006.01)
*F21Y 103/10* (2016.01)
*F21Y 115/10* (2016.01)
*F21W 131/10* (2006.01)
*F21V 14/02* (2006.01)

(56) References Cited

U.S. PATENT DOCUMENTS

| | | |
|---|---|---|
| 3,504,339 A | 3/1970 | Bailey |
| 3,706,882 A | 12/1972 | Eby |
| 3,863,999 A | 2/1975 | Muller |
| 3,910,540 A | 10/1975 | Kayler |
| 4,577,261 A | 3/1986 | Tsuyama |
| 4,891,075 A | 1/1990 | Dakubu |
| 4,968,631 A | 11/1990 | Dakubu |
| 5,019,951 A | 5/1991 | Osterhout et al. |
| 5,490,046 A | 2/1996 | Gohl et al. |
| 5,673,989 A | 10/1997 | Gohl et al. |
| 6,374,767 B1 | 4/2002 | Gohl et al. |
| 6,428,197 B1 | 8/2002 | Downing |
| D474,551 S | 5/2003 | Gohl et al. |
| D515,228 S | 2/2006 | Gebhard et al. |
| 7,244,053 B2 | 7/2007 | Bader et al. |
| D556,353 S | 11/2007 | Gebhard et al. |
| D575,424 S | 8/2008 | Gebhard et al. |
| 7,419,286 B2 | 9/2008 | Stein |
| 7,452,091 B2 | 11/2008 | LeBlanc et al. |
| 7,517,120 B2 | 4/2009 | Smith |
| 7,638,970 B1 | 12/2009 | Gebhard et al. |
| 7,651,250 B2 | 1/2010 | Griffin |
| 7,819,565 B2 | 10/2010 | Stein |
| 7,862,197 B2 | 1/2011 | Gebhard |
| 8,292,478 B2 | 10/2012 | Bader et al. |
| 8,419,207 B2 | 4/2013 | Smith |
| 8,511,526 B2 | 8/2013 | Schellens |
| 9,157,623 B2 | 10/2015 | Hui |
| 9,162,628 B2 | 10/2015 | Schellens |
| 9,169,609 B2 | 10/2015 | Lambert et al. |
| 9,255,687 B2 | 2/2016 | Gebhard et al. |
| 9,536,271 B2 | 1/2017 | Kalanick et al. |
| 9,539,952 B2 | 1/2017 | Gebhard et al. |
| 9,598,002 B2 | 3/2017 | Abe et al. |
| 9,605,843 B2 | 3/2017 | Gebhard et al. |
| 9,718,397 B2 | 8/2017 | Kalanick et al. |
| 9,937,857 B2 | 4/2018 | Kalanick et al. |
| 2006/0273121 A1 | 12/2006 | Thomas |
| 2015/0338073 A1 | 11/2015 | Neuer et al. |
| 2016/0356483 A1 | 12/2016 | Gebhard et al. |
| 2017/0080874 A1 | 3/2017 | Gebhard et al. |
| 2018/0178717 A1 | 6/2018 | Kalanick et al. |

LIGHT ASSEMBLY FOR ATTACHMENT TO A SURFACE OF A VEHICLE

CROSS-REFERENCE TO RELATED APPLICATIONS

This application claims priority to U.S. Provisional Patent Application No. 62/562,897 filed on Sep. 25, 2017, the entire content of which is incorporated herein by reference. This application also claims priority to U.S. Provisional Patent Application No. 62/727,303 filed on Sep. 5, 2018, the entire content of which is incorporated herein by reference.

FIELD OF THE INVENTION

The present invention relates to light assemblies, and more particularly to light assemblies that are mountable on vehicles.

BACKGROUND OF THE INVENTION

Vehicles sometimes included mounted lights to allow an operator to illuminate a work area. Mounted lights can produce a spot light to illuminate one specific area of the work area.

SUMMARY OF THE INVENTION

The present invention provides, in one aspect, a light assembly for attachment to a surface of a vehicle with a power source. The light assembly comprises a light head including a light, a light head terminal in electrical communication with the light, and a first mounting structure. The light assembly further comprises a first base configured to be coupled to the surface of the vehicle. The first base includes a second mounting structure configured to mate with the first mounting structure such that the light head can be removably secured on the first base. The first base also includes a conductor configured to couple to the power source of the vehicle. The first base also includes a first base terminal in electrical communication with the conductor and configured to mate with the light head terminal to provide power to the light when the light head is secured on the first base. The light assembly further comprises a second base configured to be coupled to the surface of the vehicle. The second base is different than the first base. The second base includes a third mounting structure configured to mate with the first mounting structure such that the light head can be removably secured on the second base. The second base also includes a battery and a second base terminal in electrical communication with the battery. The second base terminal is configured to mate with the light head terminal to provide power to the light when the light head is secured on the second base.

The present invention provides, in another aspect, a light assembly for attachment to a surface of a vehicle. The light assembly comprises a light head including a light, a light head terminal in electrical communication with the light, and a first mounting structure. The light assembly further comprises a vehicle base configured to be removably coupled to the surface of the vehicle. The vehicle base includes a second structure configured to mate with the first mounting structure such that the light head can be removably secured on the vehicle base. The vehicle base also includes a base terminal configured to mate with the terminal of the light head to provide power to the light when the light head is secured on the vehicle base. The light is rotatable relative to the vehicle base about a first axis and about a second axis that is different from the first axis while secured on the vehicle base.

The present invention provides, in yet another aspect, a light assembly for attachment to a surface of a vehicle. The light assembly comprises a light head including a light including a plurality of light emitting diodes and a lens. The lens has a plurality of total internal reflection lenses. The light head also includes a light head terminal in electrical communication with the light and a first mounting structure. The light assembly further comprises a vehicle base configured to be coupled to the surface of the vehicle. The vehicle base includes a second structure configured to mate with the first mounting structure such that the light head can be removably secured on the vehicle base. The vehicle base also includes a base terminal configured to mate with the terminal of the light head to provide power to the light when the light head is secured on the vehicle base.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
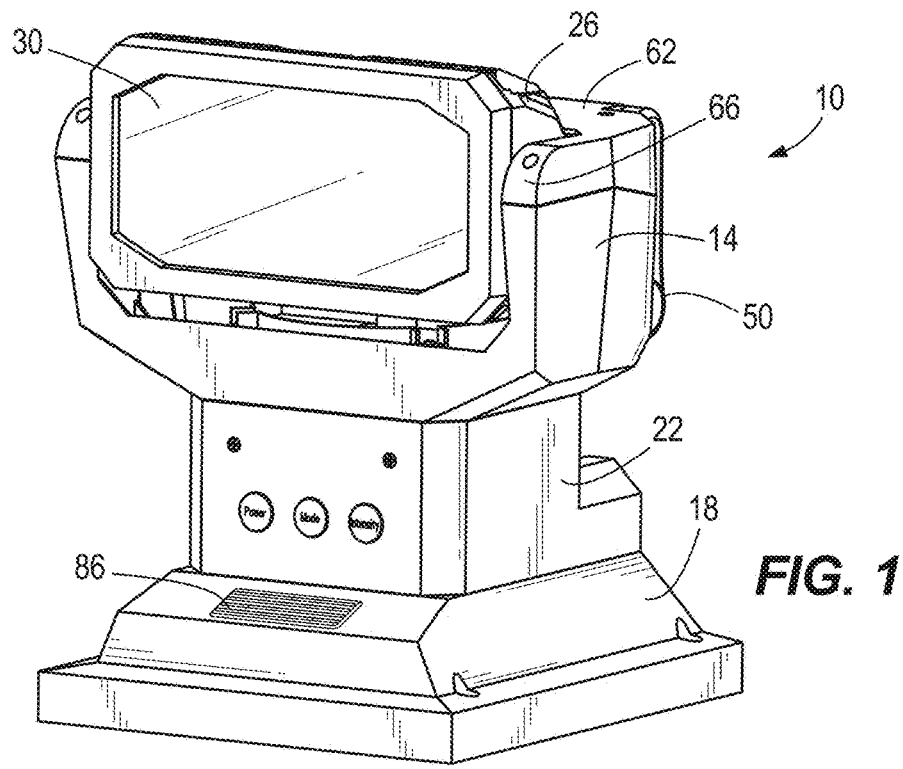
FIG. 1 is a front perspective view of a light assembly.
Figure 2:
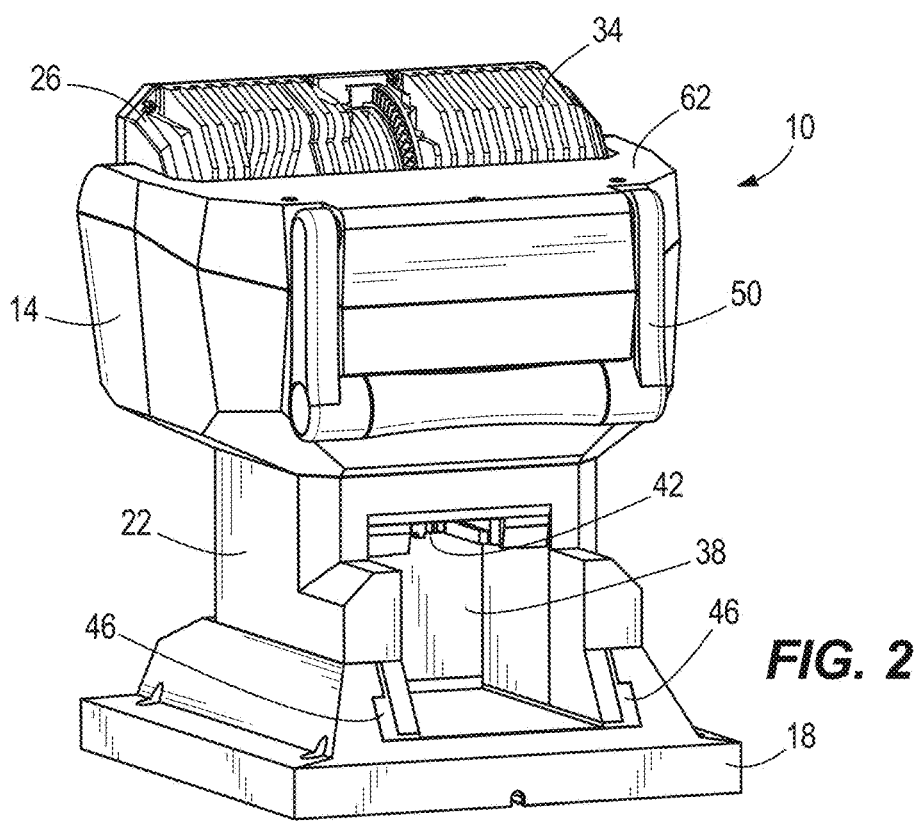
FIG. 2 is a rear perspective view of the light assembly of FIG. 1.
Figure 3:
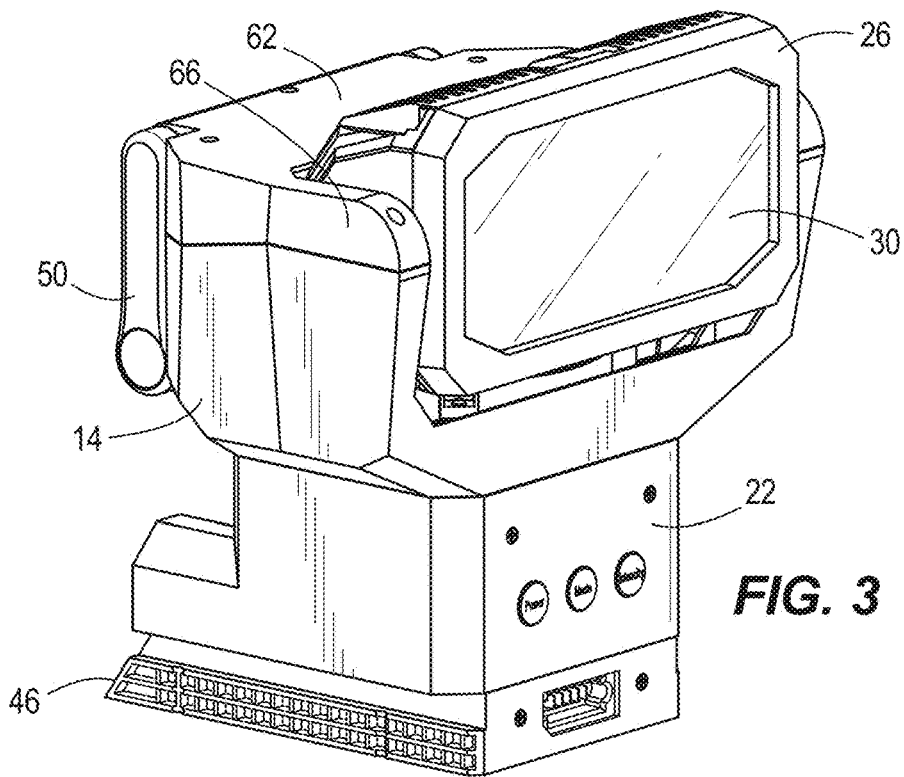
FIG. 3. is a front perspective view of a light unit of the light assembly of FIG. 1
Figure 4:
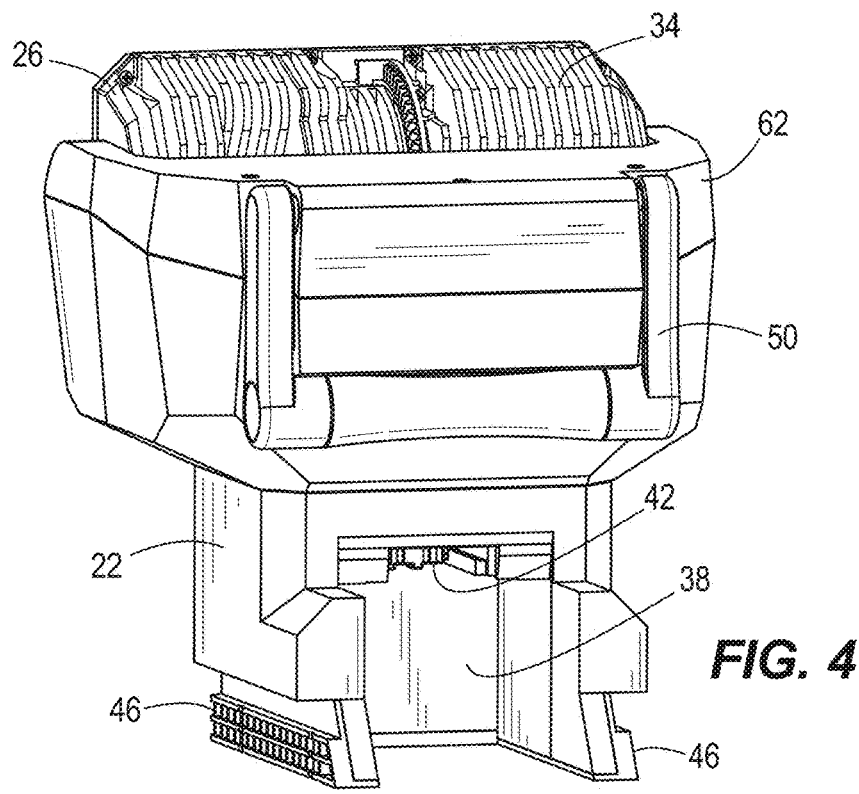
FIG. 4. is a rear perspective view of the light unit of FIG. 3.

As shown in FIGS. 1-4, a light assembly 10 that is mountable to a vehicle is provided. The light assembly 10 includes a light unit 14 that is selectively mounted in a mount 18. The light unit 14 and the mount 18 are both made of robust materials to permit the light assembly 10 to withstand 24/7 exposure to harsh environmental conditions over the life of the light assembly 10. As shown in FIGS. 3 and 4, the light unit 14 includes a base 22 and a head 26 with a light source 30 including a lens covering a plurality of LEDs (not shown). The head 26 also includes a heat sink 34 to dissipate heat while the light source 30 is in use. In some embodiments, the heat sink 34 is enclosed within a housing of the head 26, rather than being exposed. The base 22 defines a battery pack recess 38 with battery contacts 42. The base 22 includes two mating edges 46 that are configured to facilitate mounting the base 22 within the mount 18. The base 22 also includes a handle 50 so an operator may carry the light unit 14.

Figure 5:
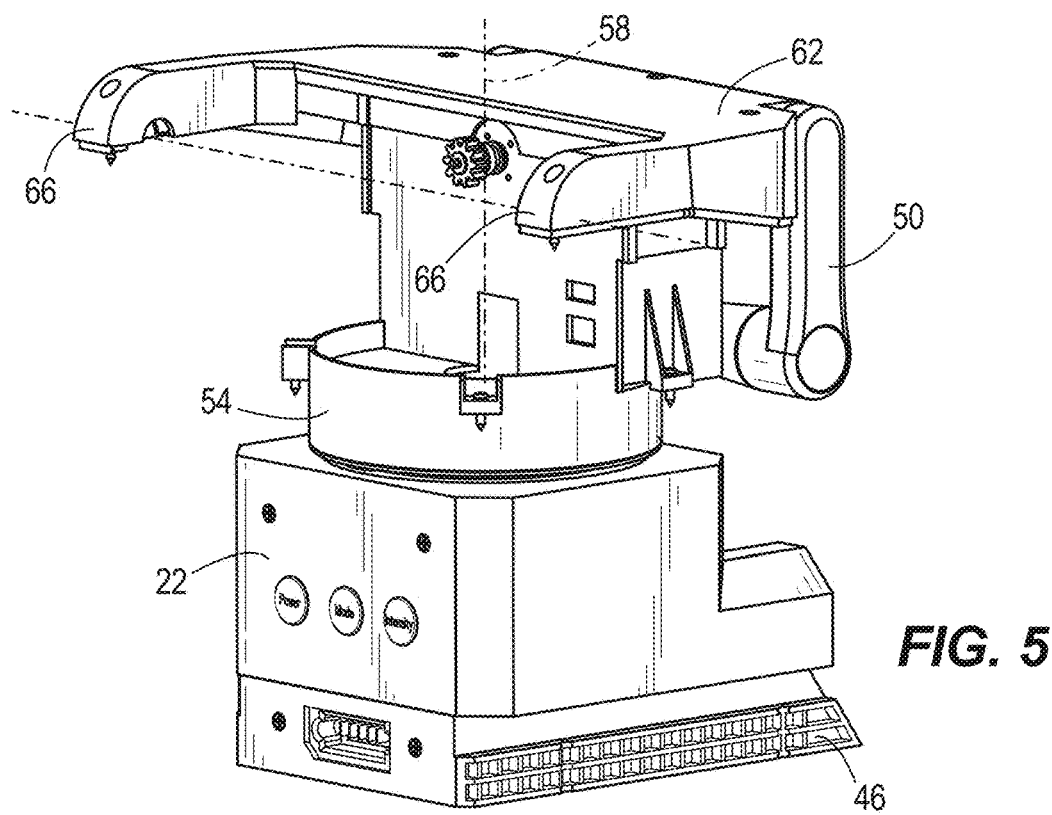
FIG. 5 is a perspective view of the light unit of FIG. 3 with portions removed.
Figure 6:
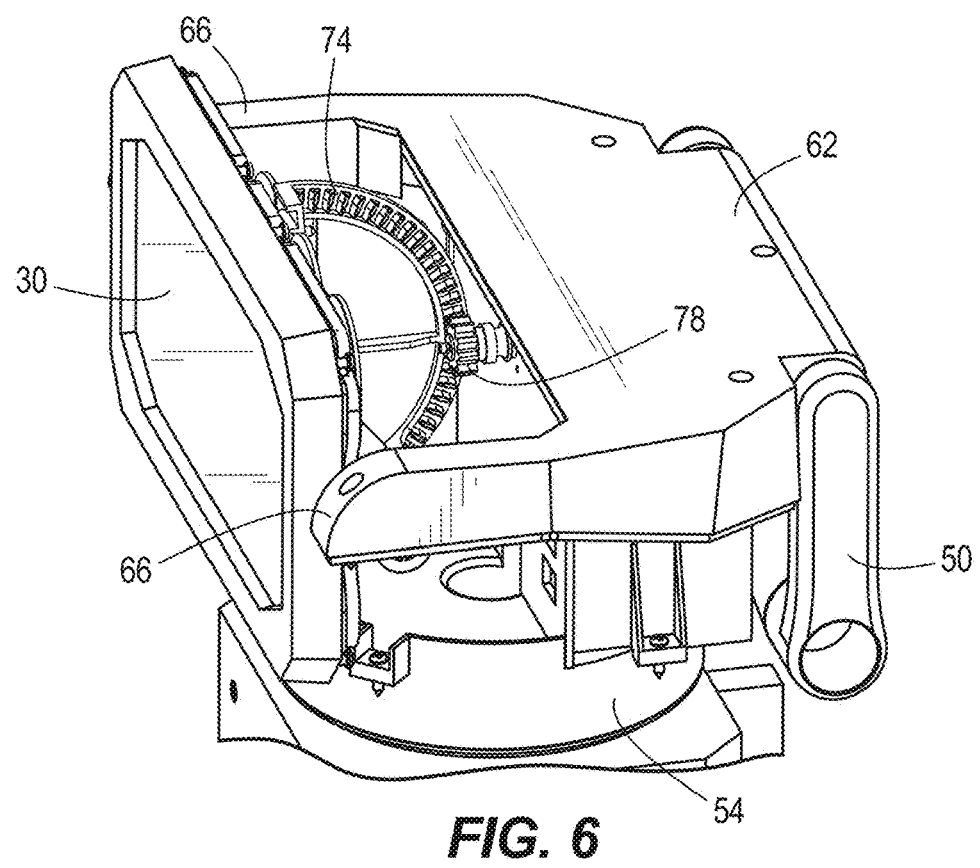
FIG. 6 is another perspective view of the light unit of FIG. 3 with portions removed.

As shown in FIG. 5, a pedestal 54 is rotatably coupled to the base 22. The pedestal 54 is capable of rotating 370 degrees about a first axis 58 defined by the pedestal 54. The pedestal 54 includes a bracket 62 with two arms 66 that define a second axis 70. The head 26 is coupled to the pedestal 54 via the arms 66. In some embodiments, the head 26 is pivotable with respect to pedestal 54 about the second axis 70 over a range of 90 degrees. In other embodiments, the head 26 is pivotable with respect to the pedestal 54 over a range of 270 or more degrees. In some embodiments, the head 26 includes a semi-circular portion 74 with a toothed edge and the pedestal 54 includes a pinion gear 78 engageable with teeth (not shown) of the toothed edge to permit the head 26 to pivot about the second axis 70.

Figure 7:
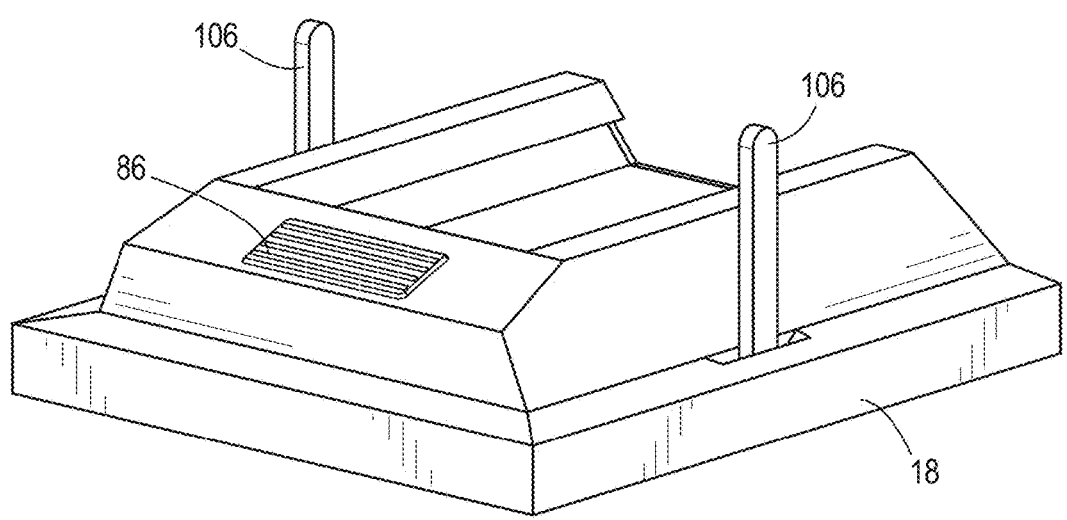
FIG. 7 is a front perspective view of a mount of the light assembly of FIG. 1.
Figure 8:
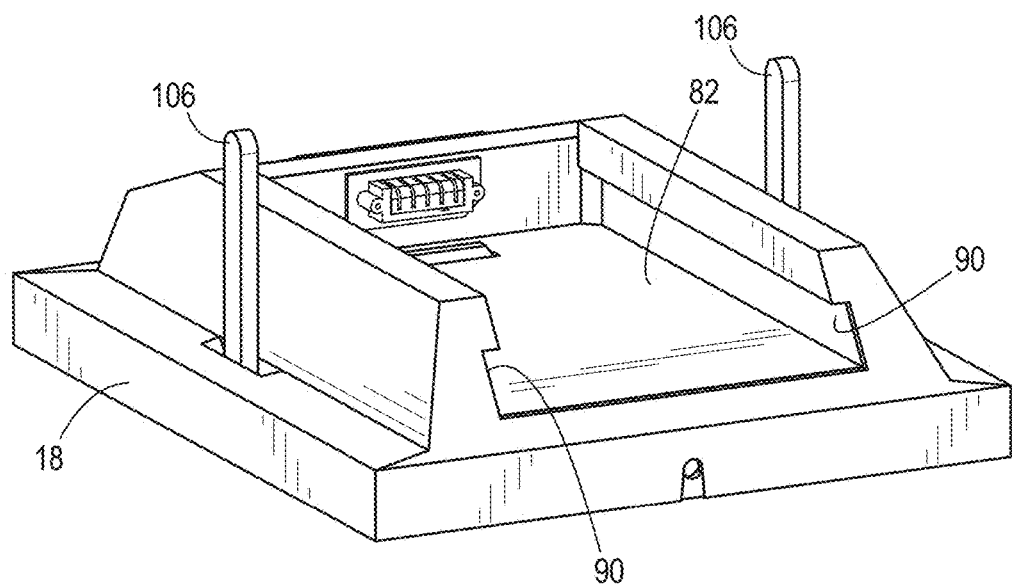
FIG. 8 is a rear perspective view of the mount of FIG. 7.
Figure 9:
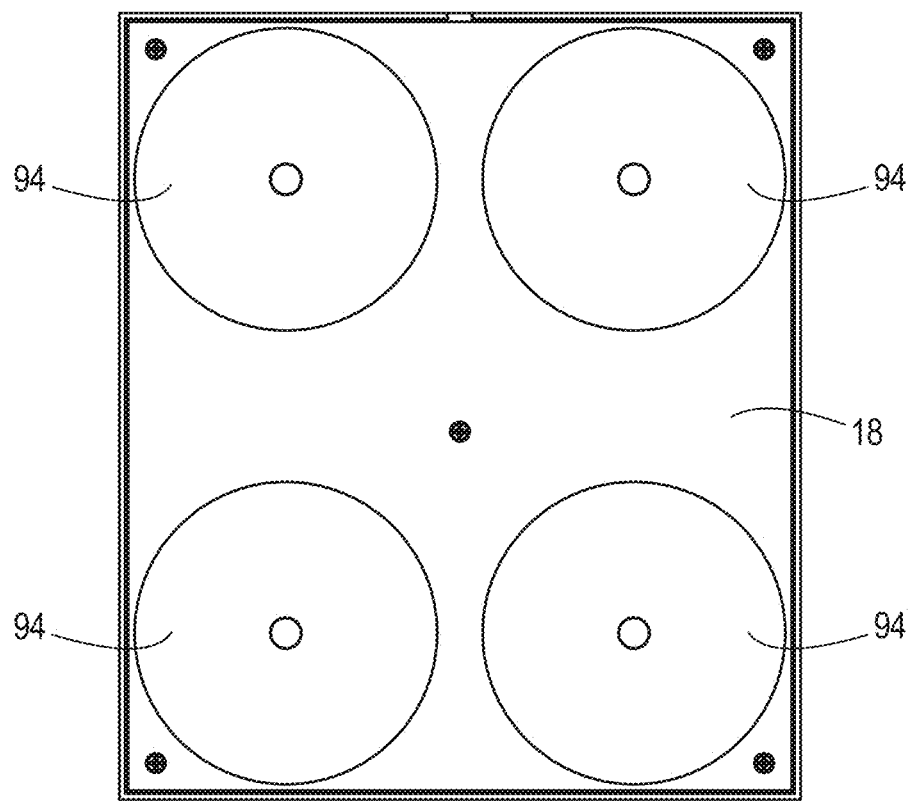
FIG. 9 is a plan view of the underside of the mount of FIG. 7.

As shown in FIGS. 7-9, the mount 18 defines a recess 82 to receive the base 22 of the light unit 14. The mount 18 includes a quick release actuator 86 and mechanism (not shown) to decouple the base 22 from the mount 18 when an operator desires to remove the light unit 14 from the mount 18. As shown in FIG. 8, within the recess 82, two laterally extending grooves 90 are defined which are configured to slideably receive the mating edges 46 of the base 22 when the base 22 is mounted within the mount 18.

Figure 12:
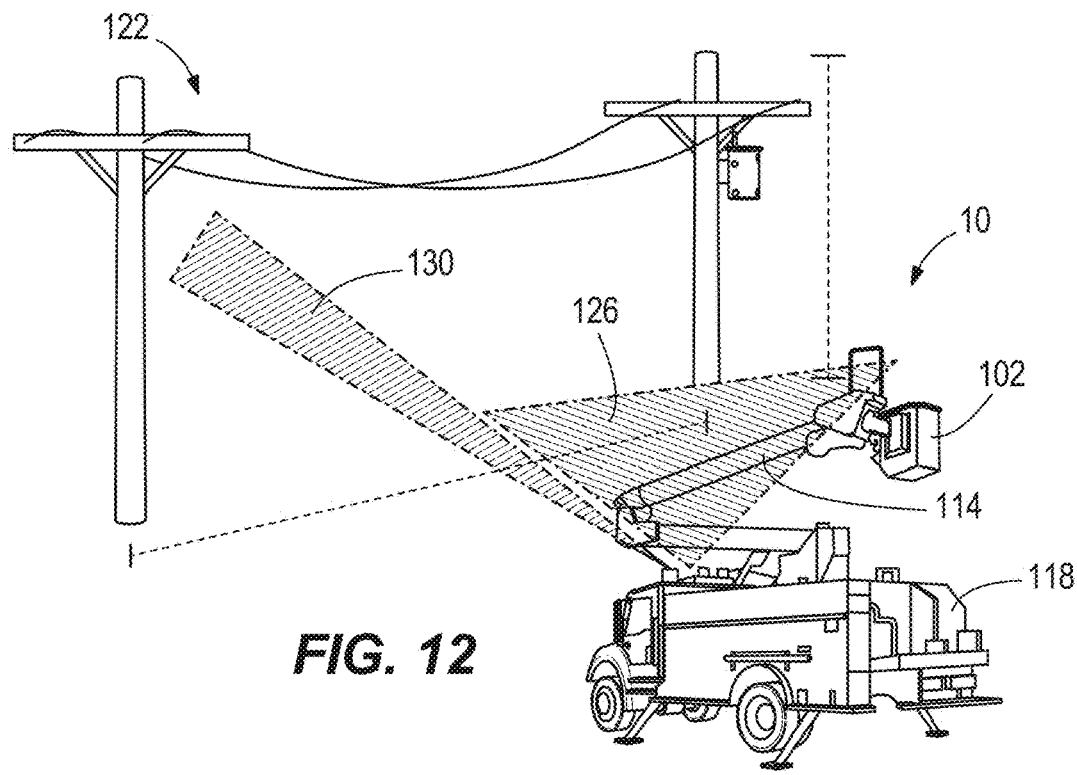
FIG. 12 is a perspective view of the light assembly of FIG. 1 mounted to a vehicle for use at a worksite.

As shown in FIG. 9, the mount 18 includes a plurality of vacuum cups 94 to facilitate attachment to a surface, such as the surface of a vehicle or a surface of an extension of the vehicle, such as a bucket 102 shown in FIG. 12. The mount 18 can also include magnets (not shown) and/or rubber pads (not shown) in lieu of or in combination with the vacuum cups 94 to facilitate attachment to the surface of the vehicle 98. If vacuum cups 94 are employed, the mount 18 can include two shanks 106 to facilitate release of the vacuum cups 94 in order to decouple the mount 18 from the surface. In some embodiments, the mount 18 is hard-mounted to a surface via bolts or fasteners, thus allowing a more permanent mounting arrangement on a surface.

Figure 10:
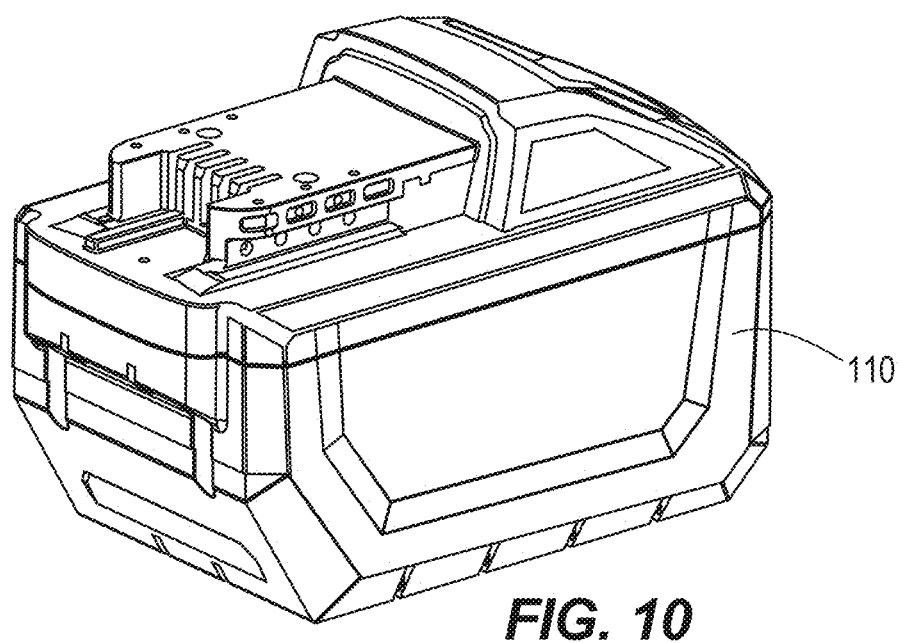
FIG. 10 is a perspective view of a battery for powering the light assembly of FIG. 1.
Figure 11:
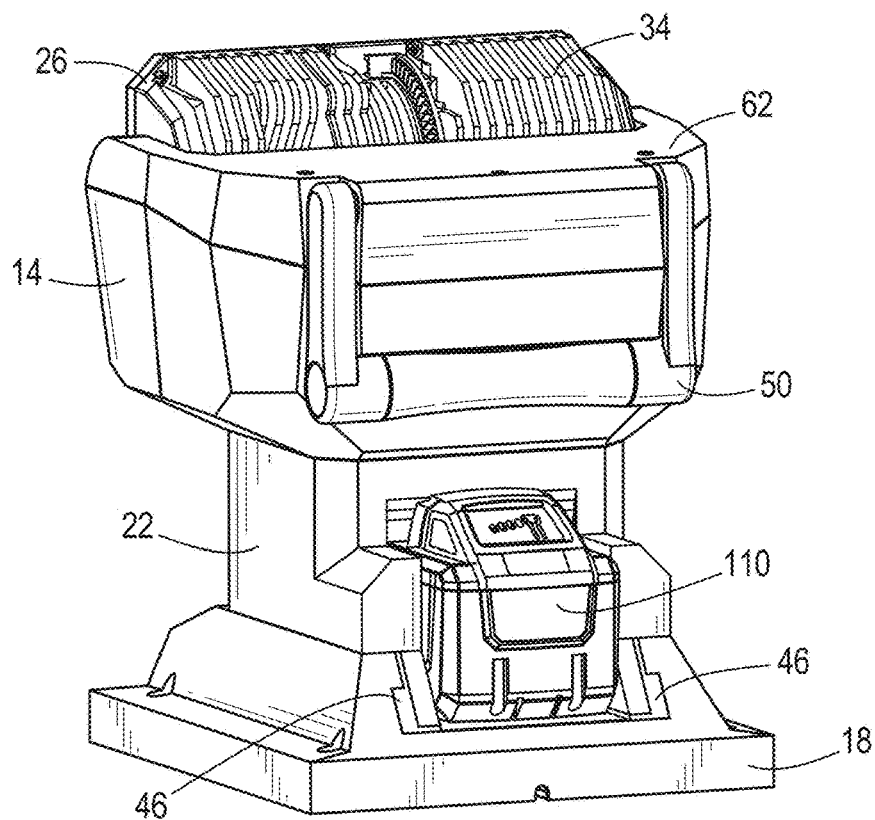
FIG. 11 is a rear perspective view of the light assembly of FIG. 1 with the battery mounted into the light assembly.

As shown in FIG. 10, in some embodiments, a battery pack 110 can be used to power the light source 30 of the light unit 14. As shown in FIG. 11, the battery 110 can be locked in the light assembly 10 when the light unit 14 is mounted to the mount 18. In some embodiments, the battery pack 110 is a power tool battery pack that is capable of being used in other power tools. In some embodiments, the battery pack 110 is built into and not removable from the light unit 14 or the mount 18. In some embodiments, the battery pack is a 12V, 18V, 40V, 60V, 80V or 120V battery pack. In some embodiments, when a non-12V battery pack 110 is used, electronics (not shown) in the light unit can up-convert the 12V DC into the battery voltage or down-convert the battery pack voltage for constant light output across voltages. In some embodiments, the LEDs of the light source 30 are capable of receiving multiple voltages, allowing the light output to vary based on the source. A series of conductive wires (not shown) electrically couple the battery pack 110 to the light source 30. In some embodiments, a slip ring is employed in the pedestal 54 to permit the pedestal 54 to continuously rotate with respect to the base 22. In other words, the pedestal 54 can rotate 360 degrees in one direction with respect to the base 22 and then continue rotating.

Figure 13:
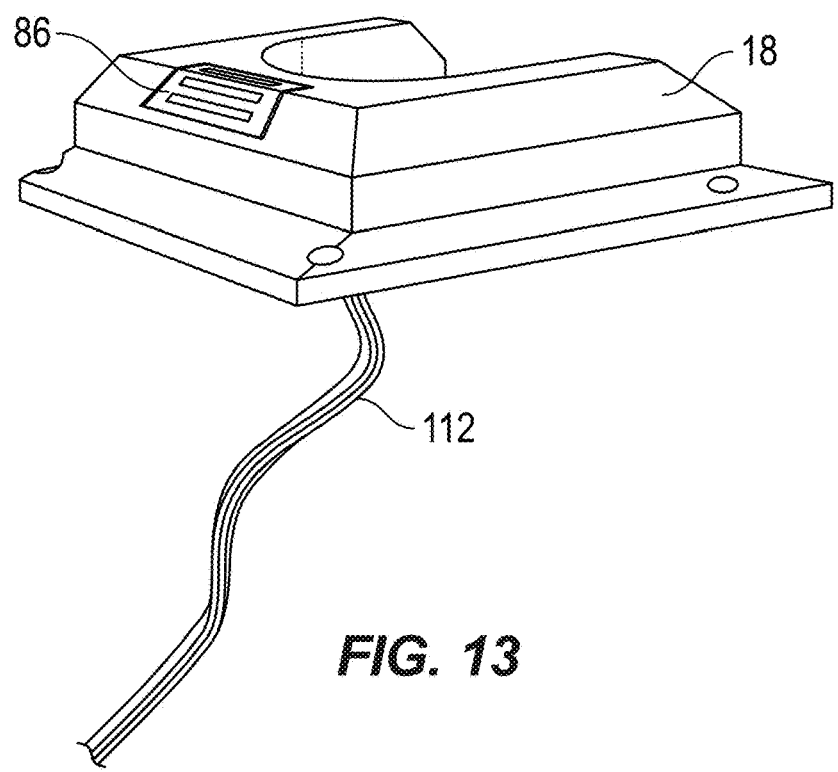
FIG. 13 is a perspective view of a mount of the light assembly of FIG. 1 with a wire harness.
Figure 14:
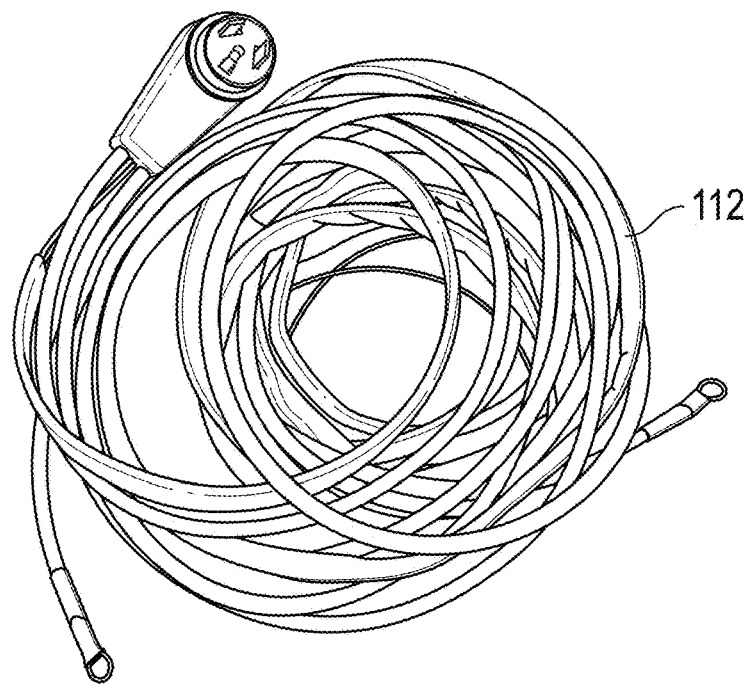
FIG. 14 is a perspective view of the wire harness of FIG. 13.

In some embodiments, as shown in FIGS. 13 and 14, the mount 18 is hardwired to provide power to the light source 30. For example, a wire harness 112 electrically couples the mount 18 to either the terminals of a vehicle battery or to the vehicle's cigarette plug. Thus, when the light unit 14 is mounted in the mount 18, the light source 30 can be powered from the vehicle, via the mount 18, rather than from the battery 110. For example, when the light unit 14 is mounted to the mount 18, the light source 30 can be powered by a 12V DC line in of the mount 18 that is electrically coupled to the vehicle through the harness 112. In all embodiments, the mount 18 is capable of utilizing the wiring harness 112, but not every mount 18 needs to be hardwired because an operator has the option of using battery pack 110. The light assembly 10 is weatherproof either through use of a cover when the light unit 14 is not mounted on the mount 18, or a weatherproof connector.

As shown in FIG. 12, the light assembly 10 is schematically shown being mounted to a bucket 102 on a boom arm 114 of a vehicle 118. In many instances, power utility linemen, municipalities, and utility contractors face situations that require them to survey a work area 122 while in their vehicle 118 in order to find out what is causing an electrical outage. The light source 30 is capable of generating a flood light 126 over the entire work area 122 and is also capable of generating a long-distance spot light 130 capable of illuminating specific areas that are a significant distance away from the light assembly 10. The flood light 126 and spot light 130 functions of the light source 30 can be used separately or together.

Figure 15:
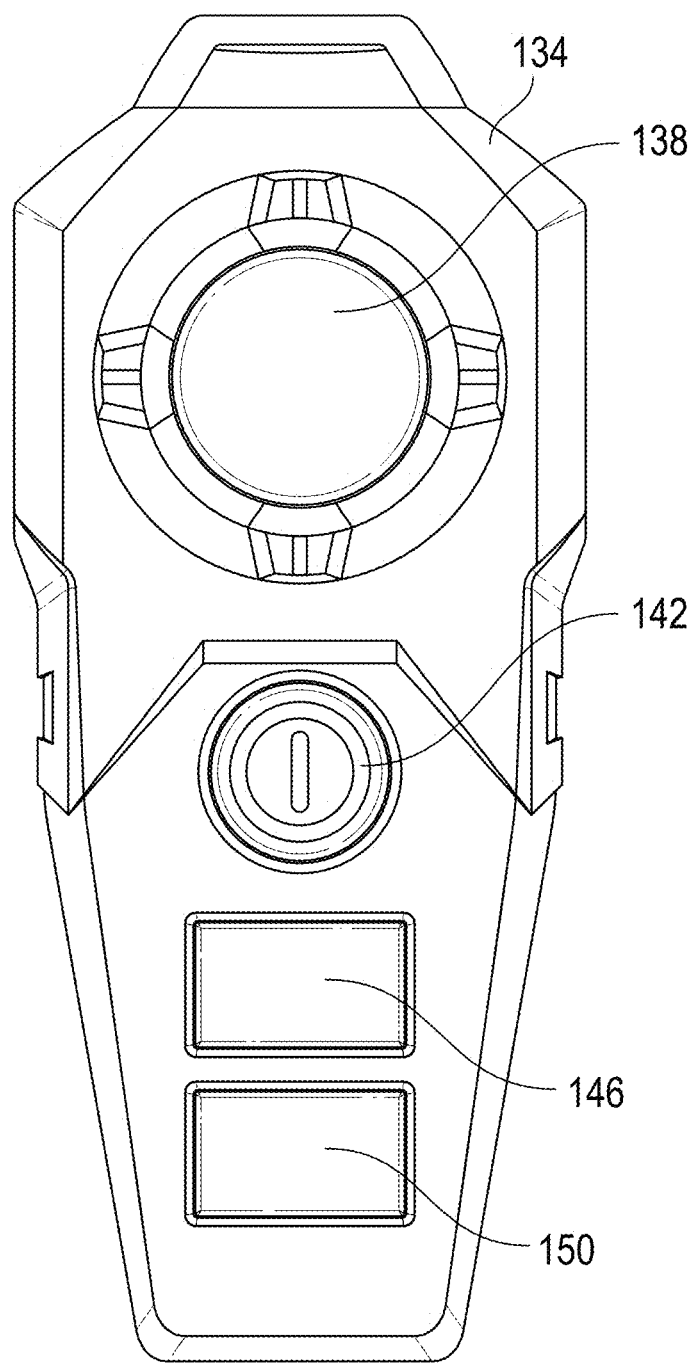
FIG. 15 is a plan view of a remote of the light assembly of FIG. 1.

As shown in FIG. 15, the direction of the light source 30 may be controlled by a remote control 134. The remote control 134 has a "home" button to reposition the head 26 to a predetermined position with respect to the first and second axes 58, 70. In some embodiments, the remote control 134 can include a D-pad 138 with up, down, right and left buttons to control the rotation and pivotal movement of the head 26 about the first and second axes 58, 70, respectively. The remote control 134 can also include a power button 142 to control powering on and off of the light source 30. In some embodiments, power button 142 can also control the "home" function to reposition the head 26, as described above. In some embodiments, the remote control 134 includes a joystick (not shown) in addition to or in lieu of the D-pad 138 to control the movement of the head 26 and thereby the direction of the light source 30. In some embodiments, the joystick or another button on the remote control 134 can control the speed at which the head 26 rotates and pivots with respect to the first and second axes 58, 70. In some embodiments, there are two distinct speeds at which the head 26 can rotate and pivot: "Faster" or "Slower." However, in other embodiments, the remote control provides for infinite control of speed within a speed range defined by maximum and minimum speeds, allowing the operator to use a variety of different speeds within that range to rotate and pivot the head 26. In some embodiments, the remote control 134 includes a mode button 146 to allow an operator to choose spot light mode, flood light mode, or simultaneous flood and spot light mode. In some embodiments, the remote control includes an intensity button 150 to control the luminescent intensity of the light source 30. In some embodiments, the mount 18 includes the aforementioned controls of the remote control 134, so an operator can control the power to the light source 30, the movement of the head 26, the speed of rotation and pivoting, and the mode and intensity of the light source 30 by operating the controls on the mount 18. In some embodiments, the remote control 134 communicates via radio frequency with the light assembly 10 to control rotation of the head 26 about the first and second axes 58, 70. In some embodiments, the D-pad 138, power button 142, mode button 146, and intensity button 150 are prevented from being inadvertently actuated, such that an inadvertent drop of the remote 134 which accidentally engages any of the D-pad 138, power button 142, mode button 146, and intensity button 150 does not respective actuation. In some embodiments, the remote 134 includes a toggle switch to turn the remote 134 off, such that none of the D-pad 138, power button 142, mode button 146, and intensity button 150 may be actuated. In some embodiments, the remote 134 includes a depression that receives a snap clip, which can in turn be mounted on a mount on, e.g., the vehicle's dash. In some embodiments, the remote 134 includes a tether or lanyard to be, e.g., looped around an operator's wrist to prevent the remote 134 from being dropped or lost.

The light assembly 10 may also include a controller that allows the location of the light assembly 10 to be remotely tracked and/or controlled by a wireless device, such as a smartphone or laptop. Similarly, the light assembly 10 may be able to be "locked out" or shut down remotely and wirelessly, to inhibit unauthorized use.

Figure 34:
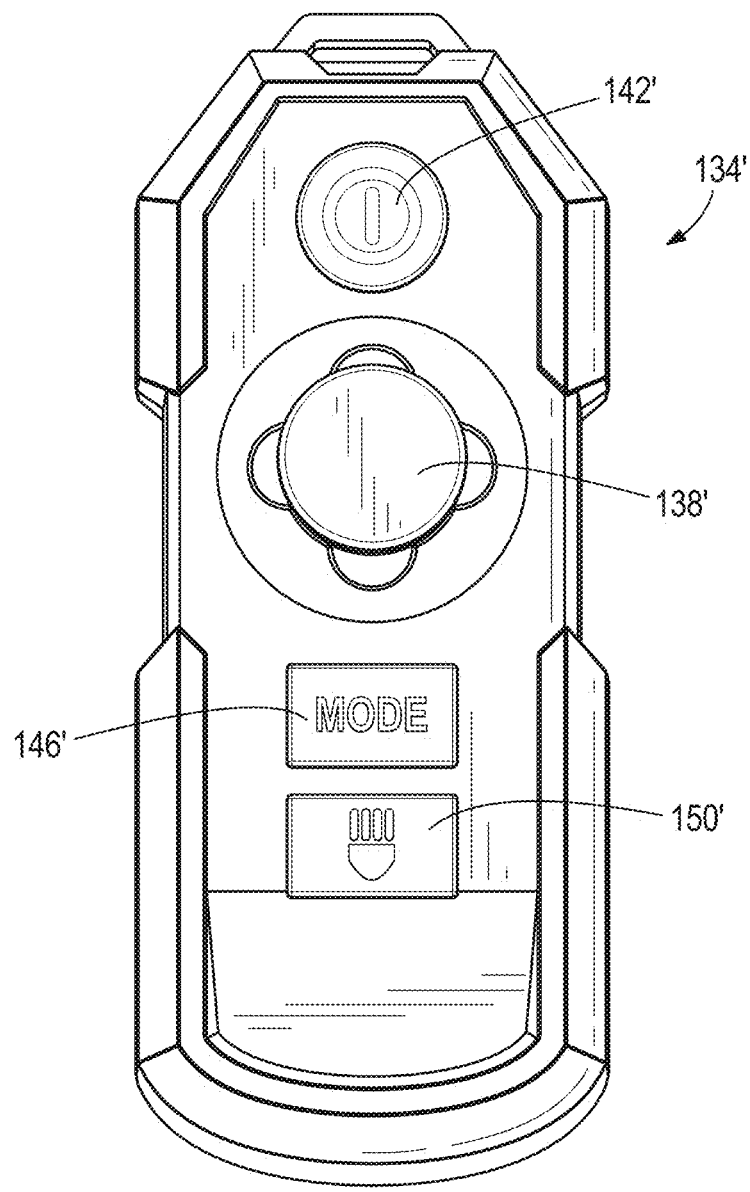
FIG. 34 is a plan view of a remote for the light assembly of FIGS. 16-33.
Figure 59:
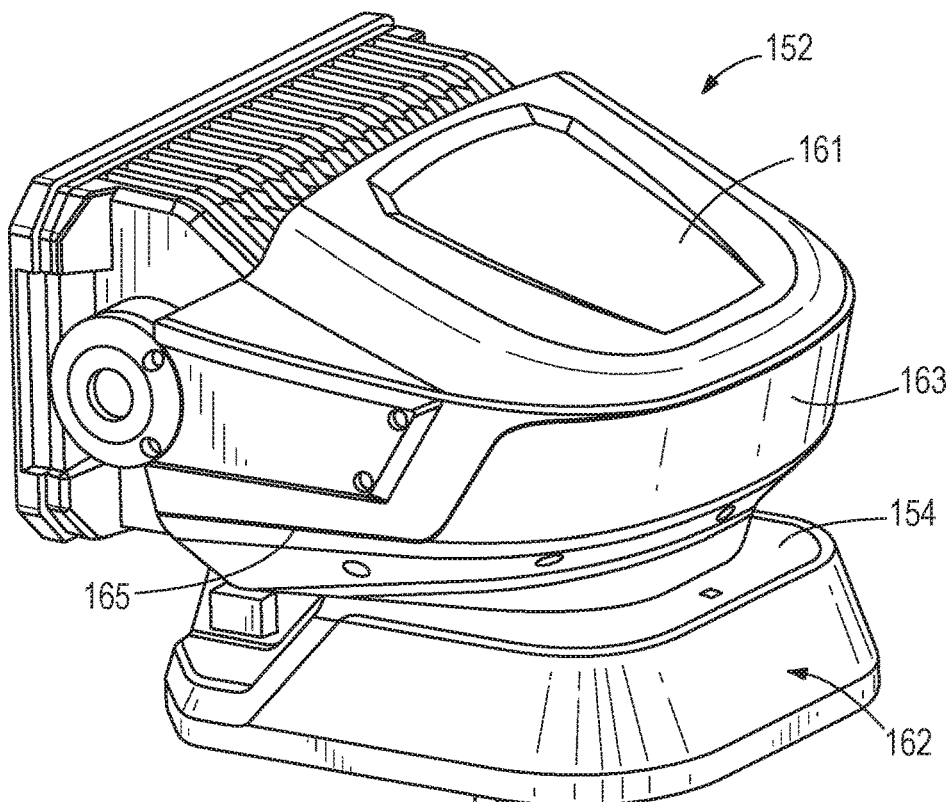
FIG. 59 is a perspective view of a light head mounted in a first base according to an embodiment of the invention.
Figure 60:
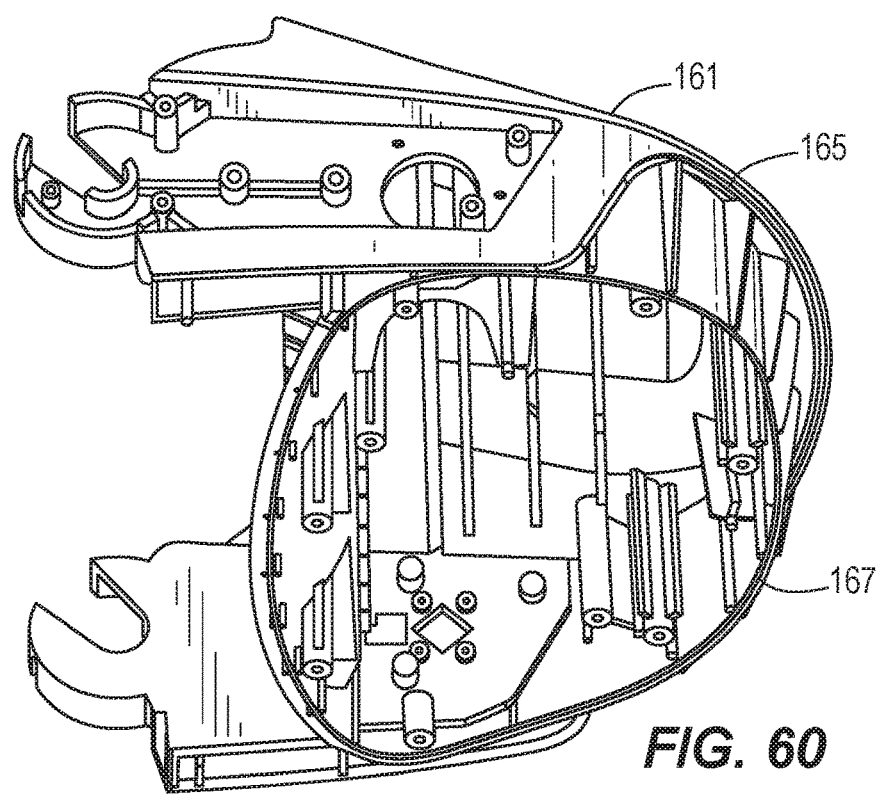
FIG. 60 is a perspective view of a first housing portion of the light head of FIG. 59.

FIGS. 16-34 illustrate another embodiment of a light assembly. The light assembly of FIGS. 16-34 includes a light head 152 (FIGS. 16, 18 and 20) having a base 154, a yoke 156, a handle 158, and a light 160. In the embodiments shown in FIGS. 59 and 60, the light head 152 has a first housing portion 161 and a second housing portion 163. The first and second housing portions 161, 163 are partitioned along a partition line 165 and a gasket 167 provides a waterproof seal between the first and second housing portions 161, 163. As shown in FIG. 60, only a portion of the gasket 167 lies along the partition line 165. In other embodiments, the gasket 167 does not intersect the partition line 165. The light assembly of FIGS. 16-34 also includes a first base 162 (FIGS. 16 and 17), a second base 166 (FIGS. 20-22), and a remote 134' (FIG. 34) for wirelessly controlling the light 160. The light head 152 is removably securable to both the first base 162 and second base 166. The remote 134' is similar to the remote 134, with like elements designated with an apostrophe. In some embodiments, the light head 152 includes a pairing button that allows a smartphone to communicate with the light head 152 to remotely track or secure the light head 152. In some embodiments, the pairing button allows the smartphone to communicate with the light head 152 via Bluetooth.

Figure 16:
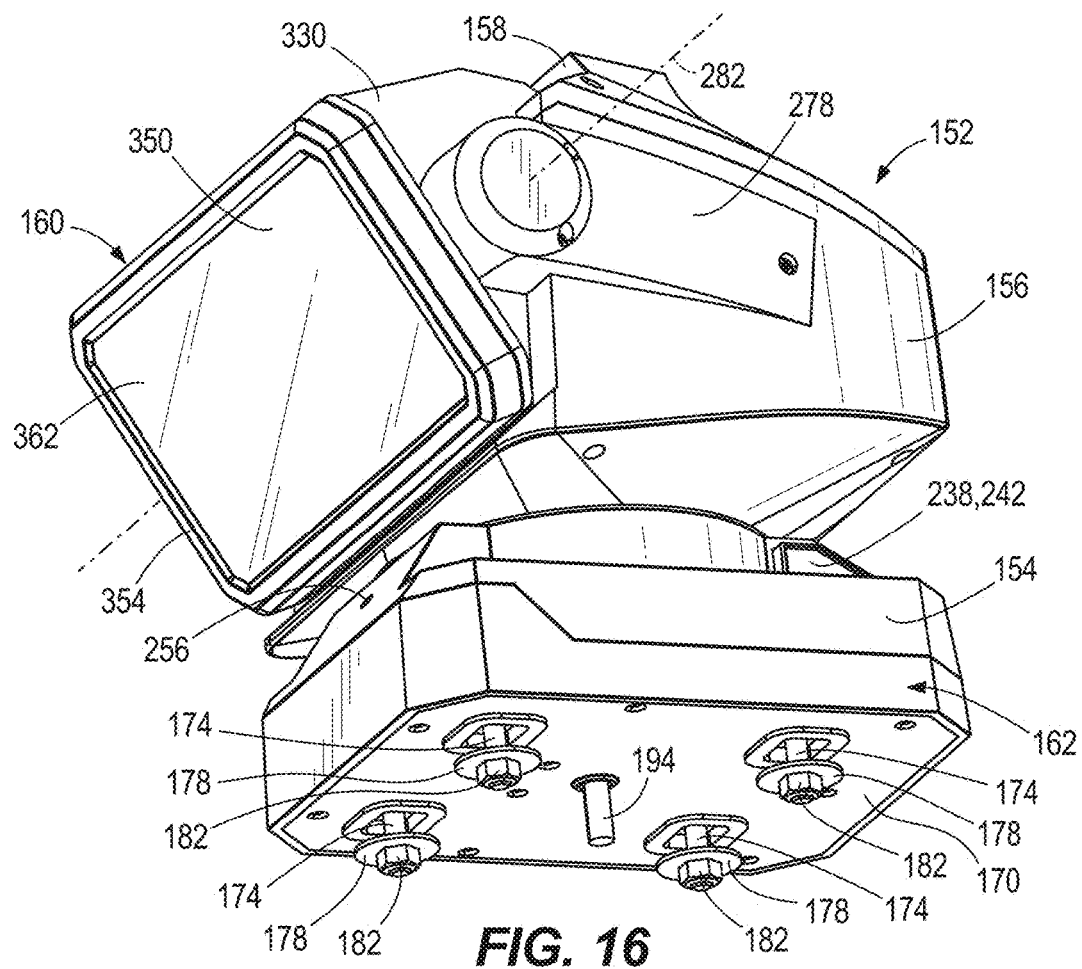
FIG. 16 is a perspective view of another embodiment of a light assembly with a light head secured in a first base.
Figure 17:
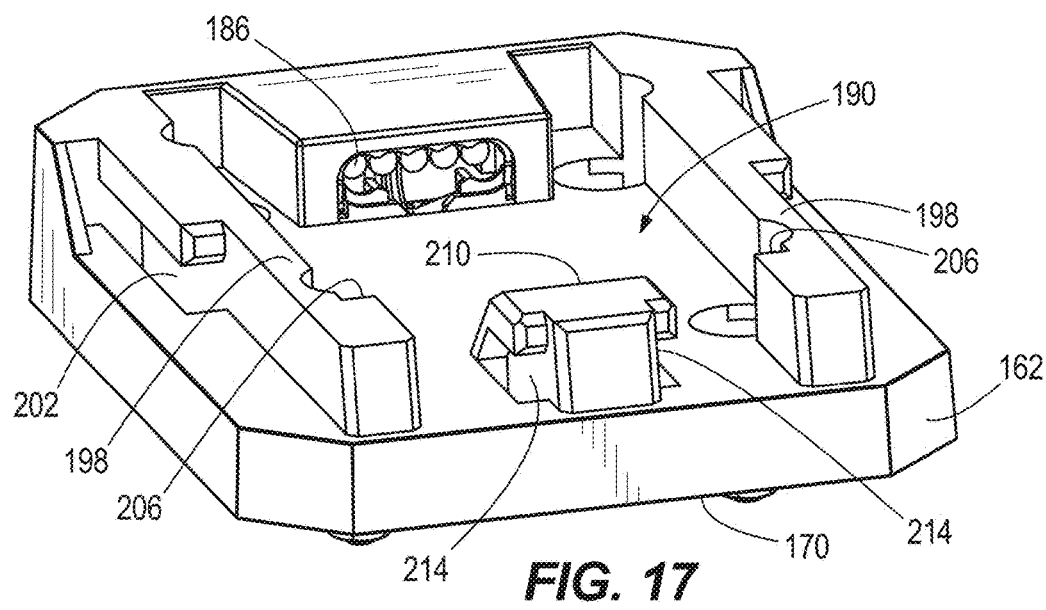
FIG. 17 is a perspective view of the first base of FIG. 16.

As shown in FIG. 16, the first base 162 includes a base surface 170 from which a plurality of fasteners 174 extend. Each of the fasteners 174 includes a washer 178 and a nut 182. In operation, the fasteners 174 may extend through a surface of a vehicle, after which the washers 178 and nuts 182 may be threaded onto the fasteners 174, such that the first base 162 is mounted to the surface of the vehicle. In some embodiments, the attachment with fasteners 174 may function as a permanent mounting arrangement, allowing the first base to be "secured to" the surface of the vehicle, such that the first base 162 is not removable from the surface of the vehicle without the use of one or more tools. With reference to FIG. 17, the first base 162 also includes a terminal 186 and a mounting structure 190 opposite the base surface 170. The terminal 186 is electrically connected to a conductor 194 that extends from the base surface 170 and is configured to couple to a power source of the vehicle, such as a cigarette lighter receptacle or a vehicle battery. The mounting structure 190 includes a pair of rails 198, each with a groove 202 and a shoulder 206. The mounting structure 190 also includes a ramp 210 with a pair of grooves 214. In some embodiments, the first base 162 includes a security lock to lock the light head 152 to the first base 162 when the light head 152 is secured to the first base 162. In some embodiments, the security lock includes a security screw, a barrel lock, or a pad lock. By providing the security lock, theft of light head 152 is deterred or prevented.

Figure 18:
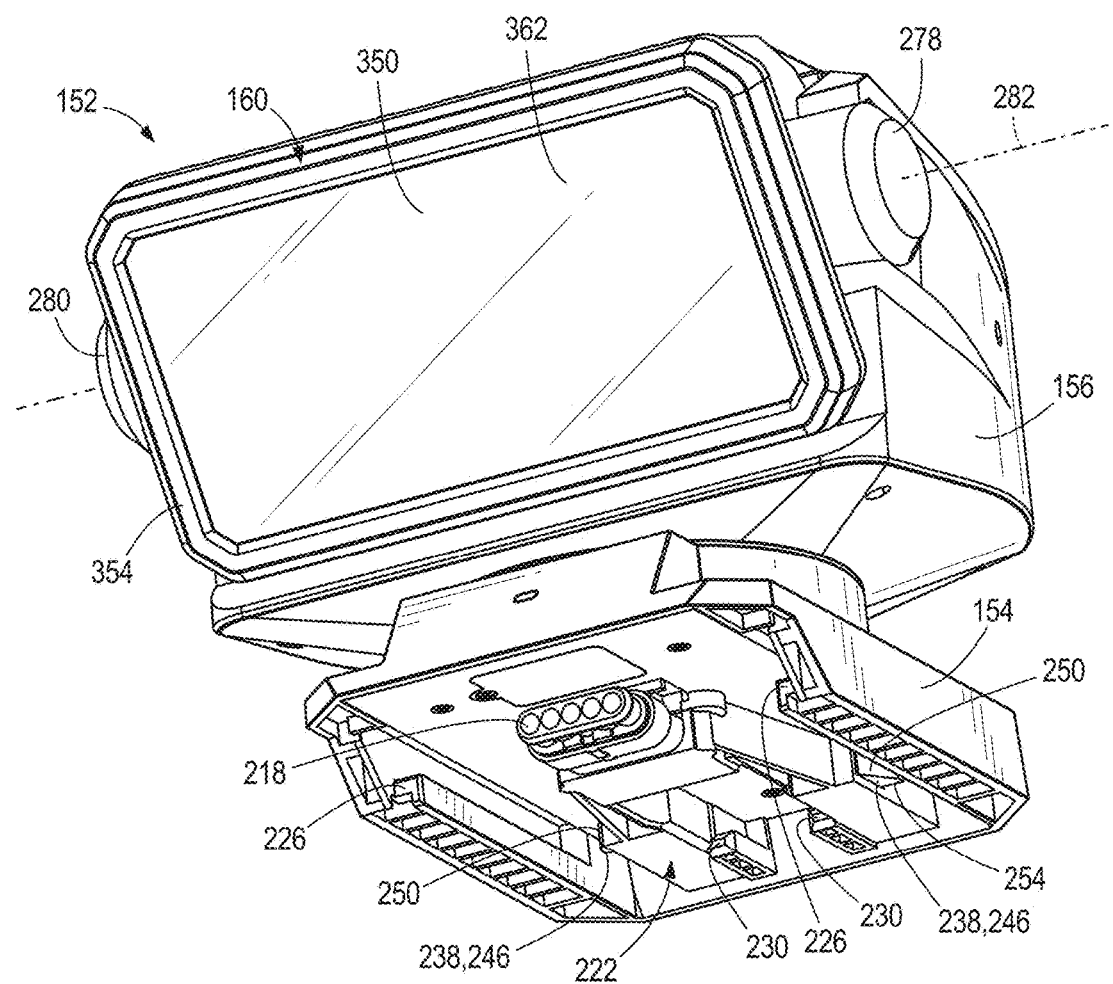
FIG. 18 is a perspective view of the light head of FIG. 16.
Figure 19:
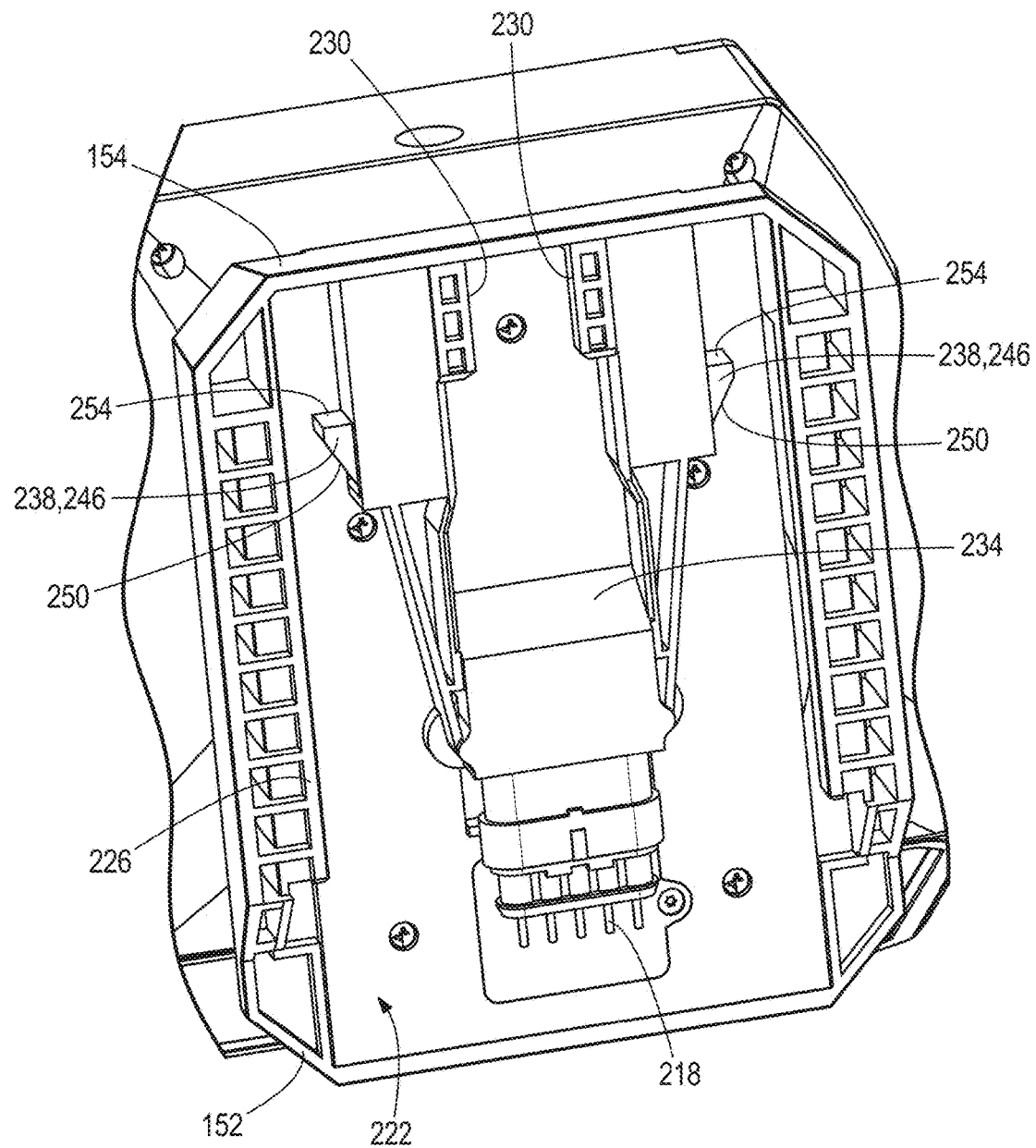
FIG. 19 is an enlarged perspective view of the light head of FIG. 16.

With reference to FIGS. 18 and 19, the base 154 of the light head 152 includes a terminal 218 in electrical communication with the light 160 and a mounting structure 222 configured to mate with the mounting structure 190 of the first base 162 to secure the light head 152 to the first base. The mounting structure 222 includes a first pair of rails 226 configured to be received in the grooves 202 of the rails 198, a second pair of rails 230 configured to be received in the grooves 214 of the ramp 210. The base 154 of the light head 152 also includes a ramp 234. With reference to FIGS. 16 and 18-20, the light head 152 also includes a pair of release actuators 238 that are biased out of the base 154 of the light head 152 to a latched position. The release actuators 238 each include a button portion 242 (FIGS. 16 and 20) and a latch portion 246 (FIGS. 18 and 19). The latch portions 246 each include a beveled edge 250 and a flat edge 254.

In operation, when an operator desires to secure the light head 152 to the first base 162, the operator slides the mounting structure 222 of the light head 152 into engagement with the mounting structure 190 of the first base 162, causing the first pair of rails 226 to be received into the grooves 202 of the rails 198 and the second pair of rails 230 to be received in the grooves 214 of the ramp 210. As the light head 152 is moved relative to the first base 162, the beveled edges 250 of the latch portions 246 of the release actuators 238 slide along the rails 198 of the mounting structure 222, causing the release actuators 238 to be depressed into the base 154 of the light head 152, until the flat edges 254 of the latch portions of the release actuators 238 pass by the shoulders 206. At this point the release actuators 238 are biased outwardly to the latched position, such that the flat edges 254 are caught against the shoulder 206, and the terminal 218 of the light head 152 has mated with the terminal 186 of the first base 162.

As shown in FIG. 16, the light head 152 includes an indicator light 256 to indicate that the terminal 218 of the light head 152 has engaged with the terminal 186 of the first base 162. In some embodiments, the indicator light 256 can be used to indicate that a smartphone has achieved a wireless connection with the light head 152. Because the flat edges 254 of the latch portions 246 are caught against the shoulders 206, the light head 152 is inhibited from moving in a first direction that would move the terminal 218 of the light head 152 away from the terminal 186 of the first base 162. Because the first pair of rails 226 of the mounting structure 222 are caught in the grooves 202 and the second pair of rails 230 are caught in the grooves 214 of the ramp 210, the light head 152 is inhibited from moving in a second direction that is perpendicular to base surface 170 and upward as viewed in FIG. 16. In the illustrated embodiment, the second direction of inhibited movement is perpendicular to the first direction of inhibited movement. Because the light head is inhibited from moving in both the first and second directions, the light head 152 is secured on the first base 162. Also, the light 160 is powered by the first base 162, via the conductor 194 drawing power from the vehicle power source and mating connection of terminals 186, 218. Once the light head 152 is secured on the first base 162, the operator may optionally actuate the security lock to lock the light head 152 to the first base 162, such that the light head 152 cannot be removed from first base 162 until first unlocking the security lock.

In operation, when an operator desires to remove the light head 152 from the first base 162, the operator presses and holds each of the button portions 242 of the release actuators 238, such that the flat edges 254 move off of the shoulders 206 of the rails 198, thus moving the release actuators 328 from the latched position to an unlatched position. While holding the button portions 242, the operator slides the light head 152 in the first direction, away from the terminal 186 of the first base 162, causing the ramp 234 of the base 154 of light head 152 to slide along the ramp 210 of the mounting structure 190 of the first base 162, making it easier for the operator to separate the light head 152 from the first base 162.

Figure 20:
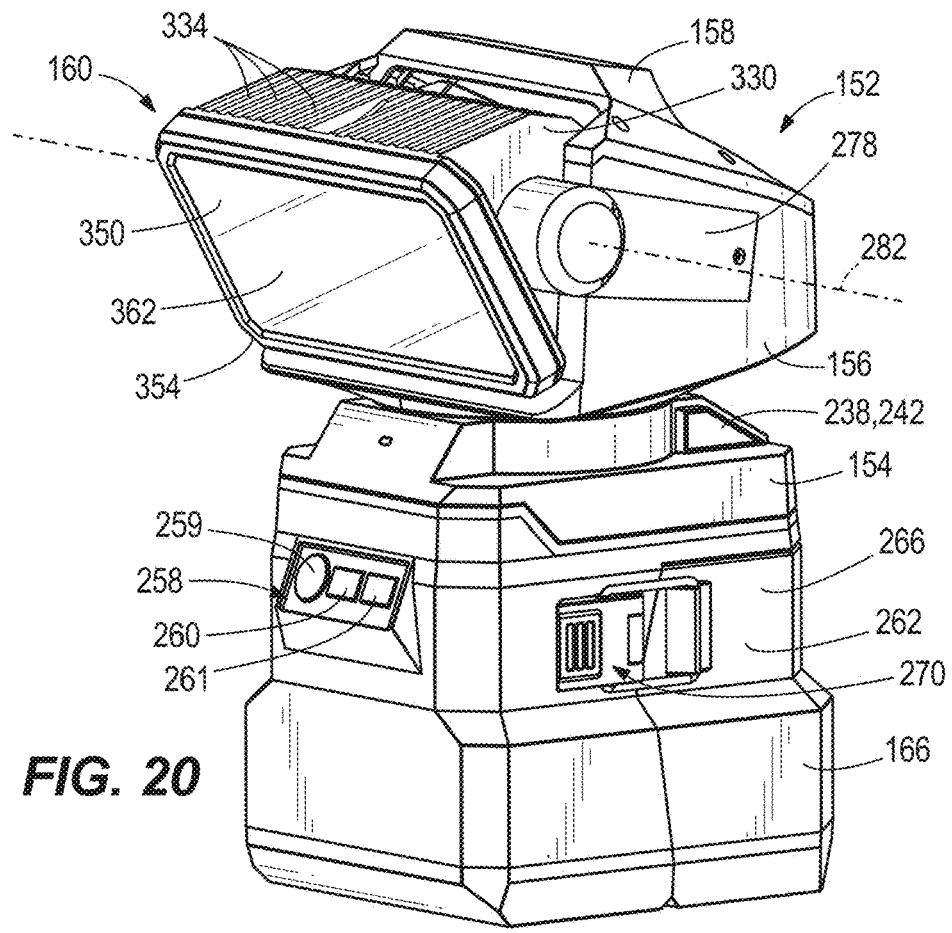
FIG. 20 is a perspective view of the light head of FIG. 16 secured in a second base.
Figure 21:
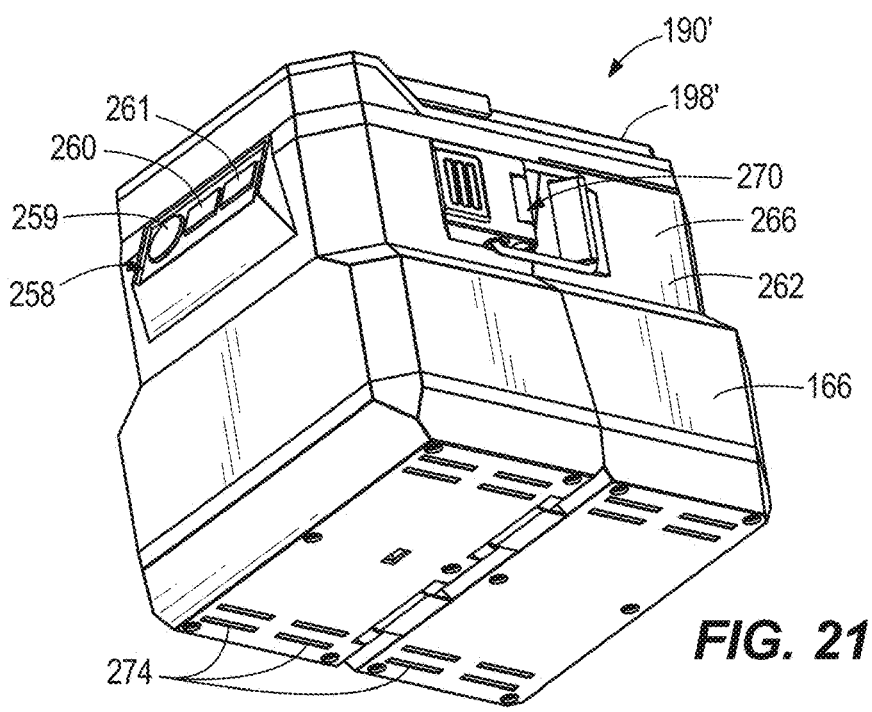
FIG. 21 is a perspective view of the second base of FIG. 20.
Figure 22:
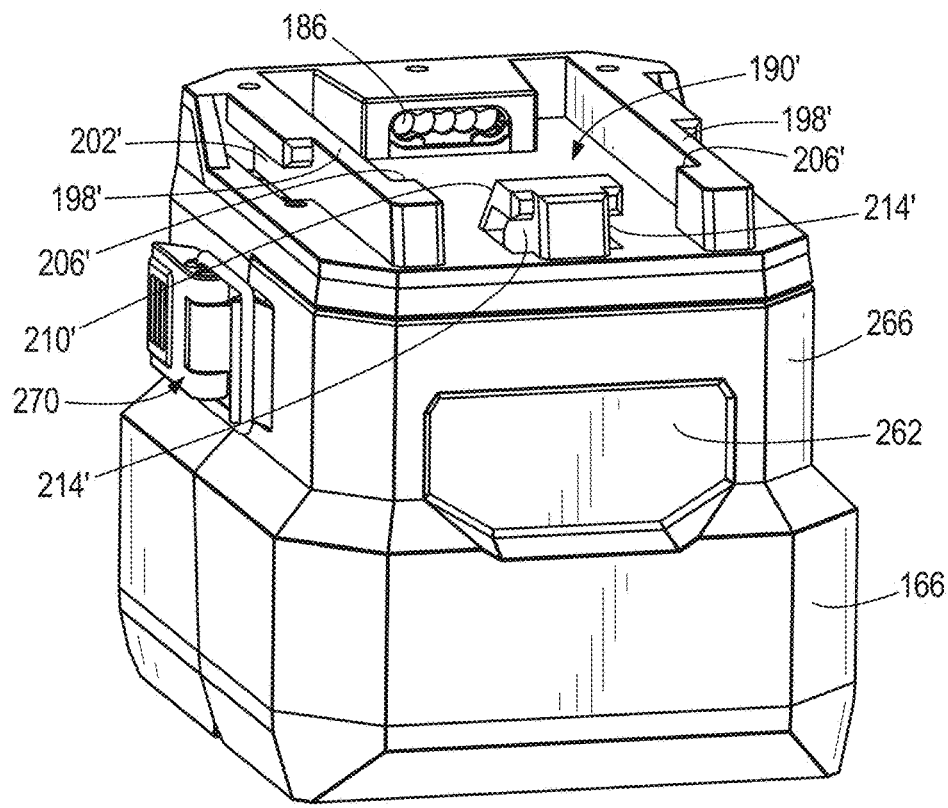
FIG. 22 is a perspective view of the second base of FIG. 20.

With reference to FIGS. 20 and 21, the second base 166 includes a control interface 258 for controlling the light head 152 when the light head 152 is secured to the second base 166. The control interface 258 includes a power button 259, a mode button 260 for switching between spot light and flood light modes, and a flood intensity button 261 for switching between high and low intensity modes. The second base 166 also includes battery in a battery compartment 262 that is accessible via a compartment door 266. The compartment door 266 is secured shut via one or more over-center latch mechanisms 270 and keeps the battery compartment 262 dry and protected from the elements. As shown in FIG. 21, the second base 166 includes a plurality of magnets 274, such that the second base 166 can be attached to and removed from the surface of a vehicle without the use of tools, thus making the second base 166 more mobile and versatile than the first base 162. With reference to FIG. 22, the second base 166 includes a mounting structure 190' that is identical to the mounting structure 190 of the first base 162, with like elements designated with an apostrophe, such that the light head 152 can be secured to and removed from the second base 166 in the exact same manner as the first base 162. The terminal 186 of the second base 166 is in electrical communication with the battery of the second base 166, such that when the light head 152 is secured to the second base 166, the light 160 is powered by the second base 166, via the battery and mating connection of terminals 186, 218.

Thus, the light assembly of FIGS. 16-34 provides an operator with a variety of lighting options while working with one or more vehicles. For instance, the first base 162 may be permanently secured to one vehicle and the second base 166 may be quickly switchable between being secured to a variety of different vehicles via the magnets 274. The operator is thus afforded greater versatility when desiring to use the light head 152, because the light head 152 mounts in the same manner to both the first and second bases 162, 166.

Figure 23:
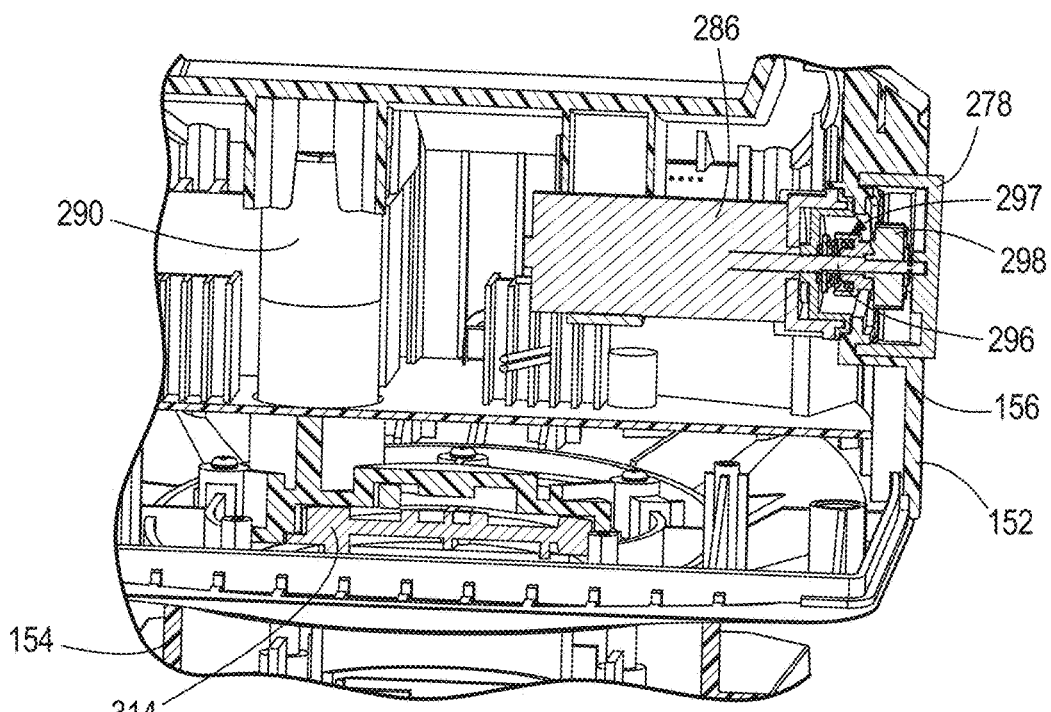
FIG. 23 is a cross-sectional view of the light head of FIG. 16.
Figure 24:
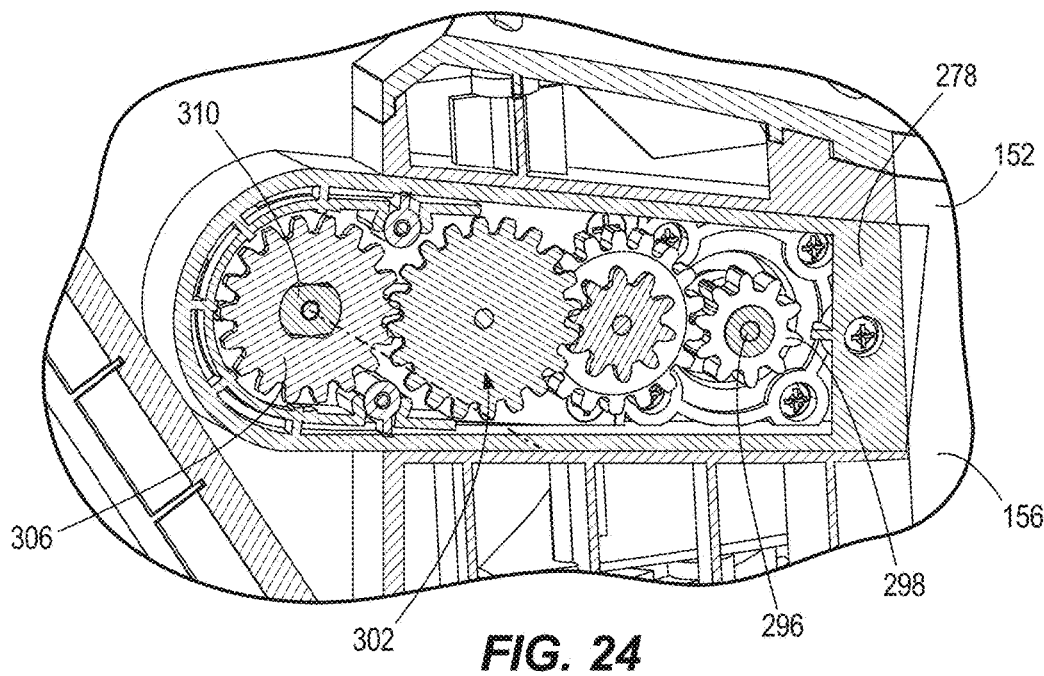
FIG. 24 is a cross-sectional view of the light head of FIG. 16.
Figure 25:
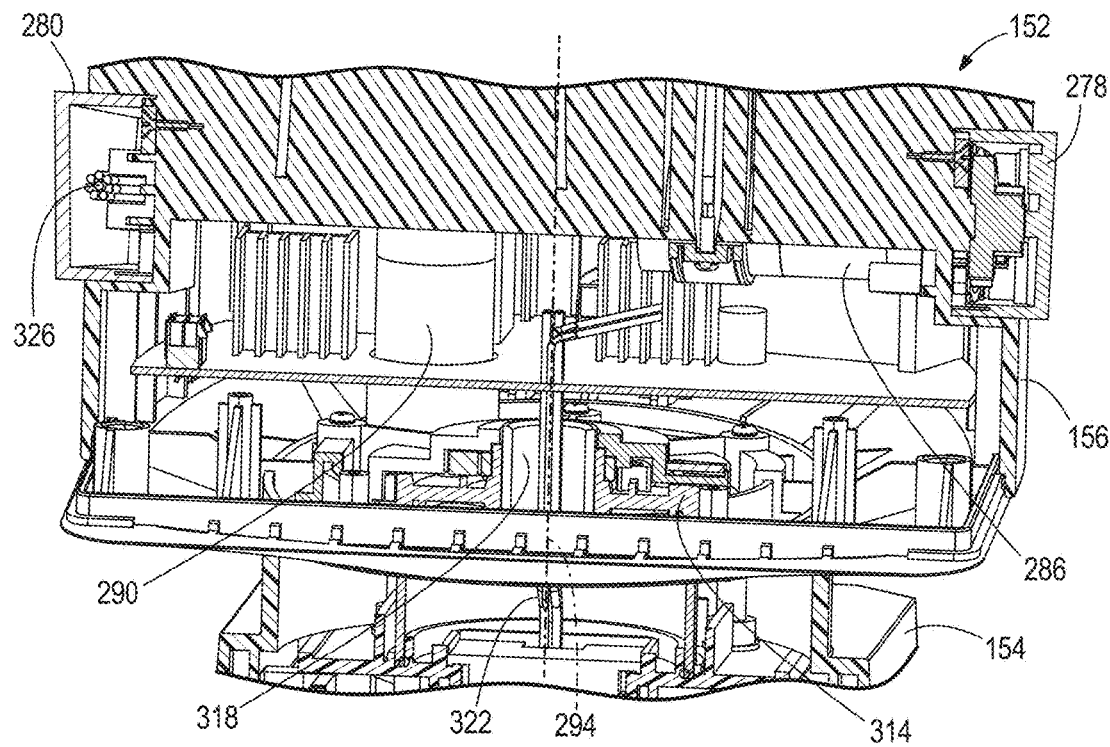
FIG. 25 is a cross-sectional view of the light head of FIG. 16.
Figure 26:
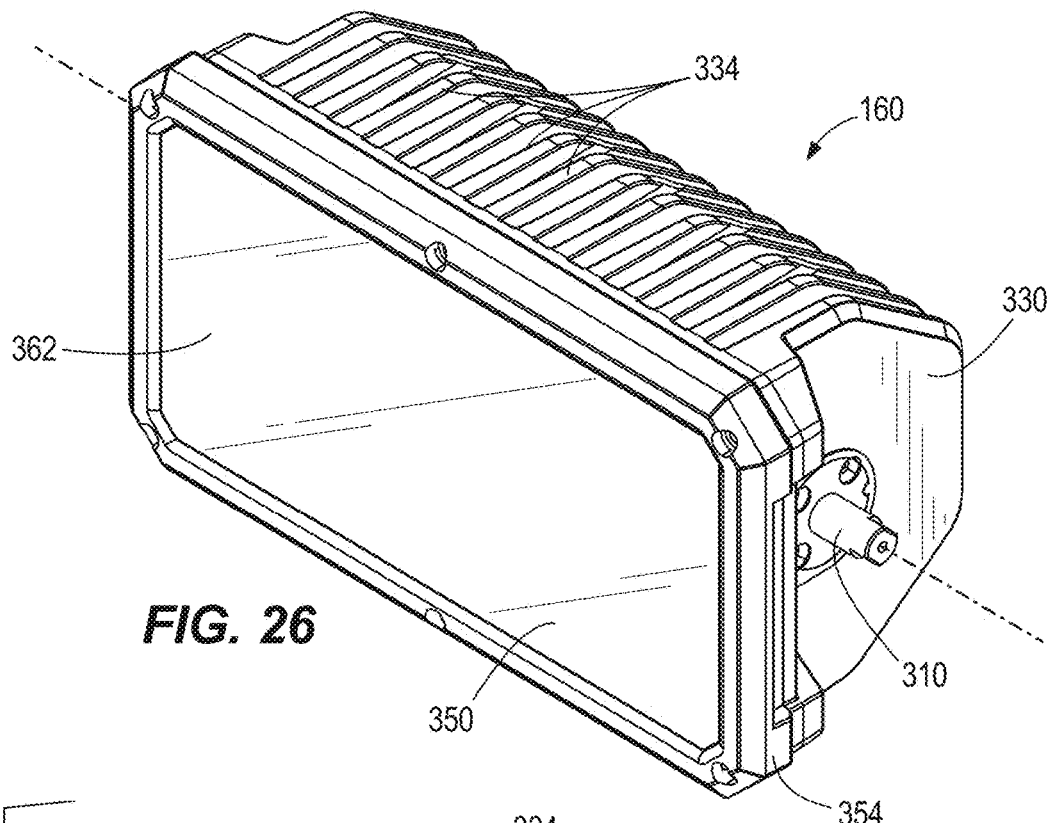
FIG. 26 is a perspective view of a light of the light head of FIG. 16.

With reference again to FIGS. 16 and 18, the yoke 156 of the light head 152 includes first and second arms 278, 280 that couple the light 160 to the yoke 156, and permit the light 160 to rotate about a first rotational axis 282 with respect to the yoke 156, as explained in further detail below. With reference to FIGS. 23-25, the yoke includes a first motor 286 to rotate the light 160 with respect to the yoke 156 about the first rotational axis 282 and a second motor 290 to rotate the yoke 156 with respect to the base 154 about a second rotational axis 294. Like the light 160, the first and second motors 286, 290 draw power from the first and second bases 162, 166, depending on which base the light head 152 is secured to. As shown in FIGS. 23 and 24, a drive shaft 296 extends from the first motor 286 and is received by a clutch 297, which in turn drives a pinion 298. The clutch 297 may prevent damage to the light head 152 when an operator user adjusts the light head 154 by hand. The pinion 298 is engaged with a gear train 302 terminating in an output gear 306 and arranged in the first arm 278. As shown in FIGS. 24 and 26, the output gear 306 drivingly engages an axle 310 of the light 160 that defines the first rotational axis 282, thus permitting the light 160 to rotate about the first rotational axis 282 with respect to the yoke 156. With reference to FIGS. 23 and 25, the second motor 290 drivingly engages a yoke gear 314 to which the yoke 156 is coupled for rotation and that defines the second rotational axis 294. The yoke gear 314 is arranged about a conduit 318 permitting passage of a conductor 322 that electrically couples the terminal 218 to the first motor 286, the second motor 290, and the light 160. As shown in FIG. 25, another conductor 326 extends through the second arm 280 to transmit power to the light 160.

Figure 27:
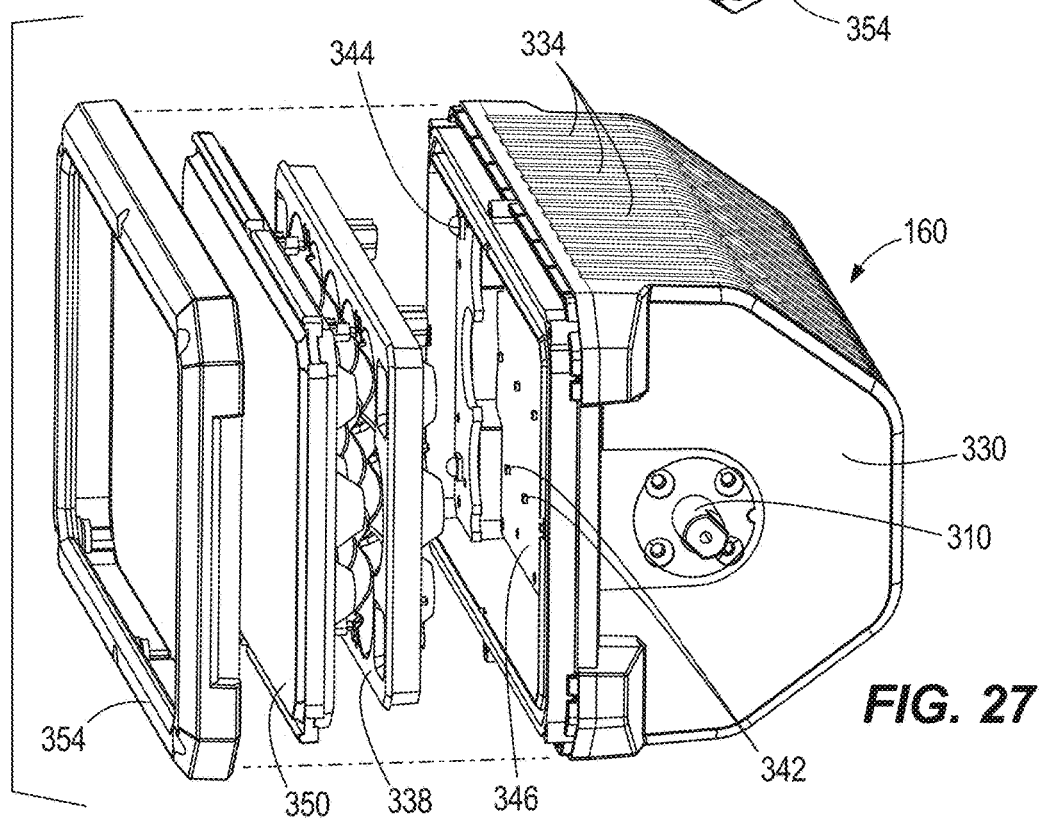
FIG. 27 is an exploded view of the light of FIG. 26.
Figure 28:
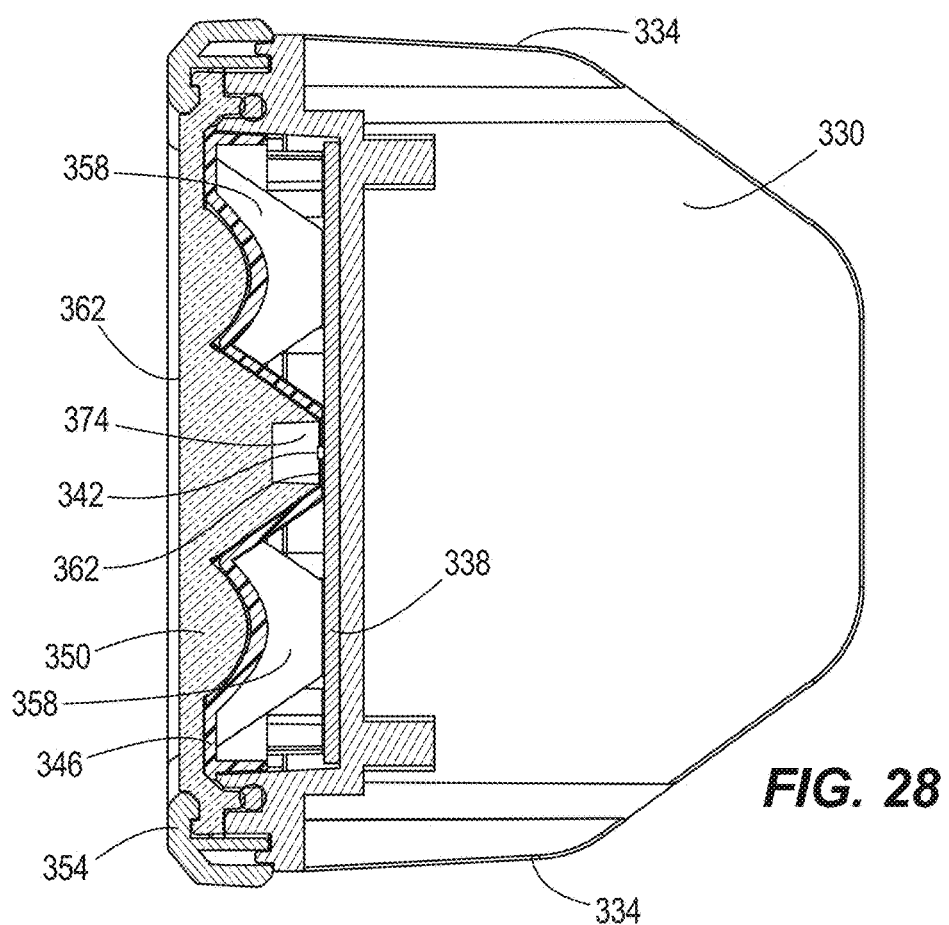
FIG. 28 is a cross-sectional view of the light of FIG. 26.
Figure 29:
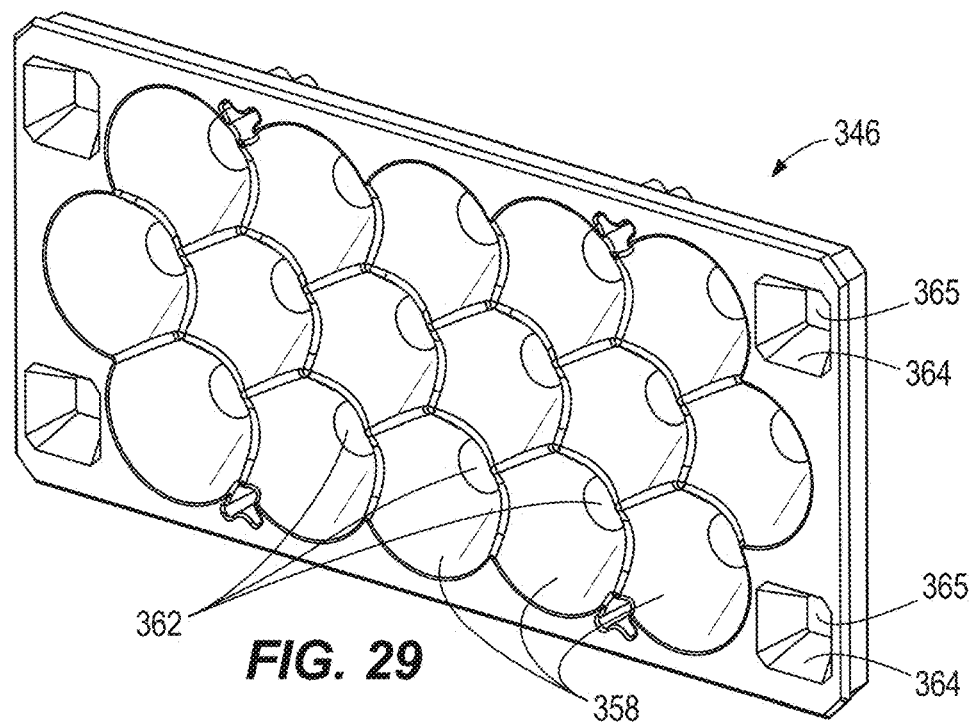
FIG. 29 is a perspective view of a reflector of the light of FIG. 26.
Figure 30:
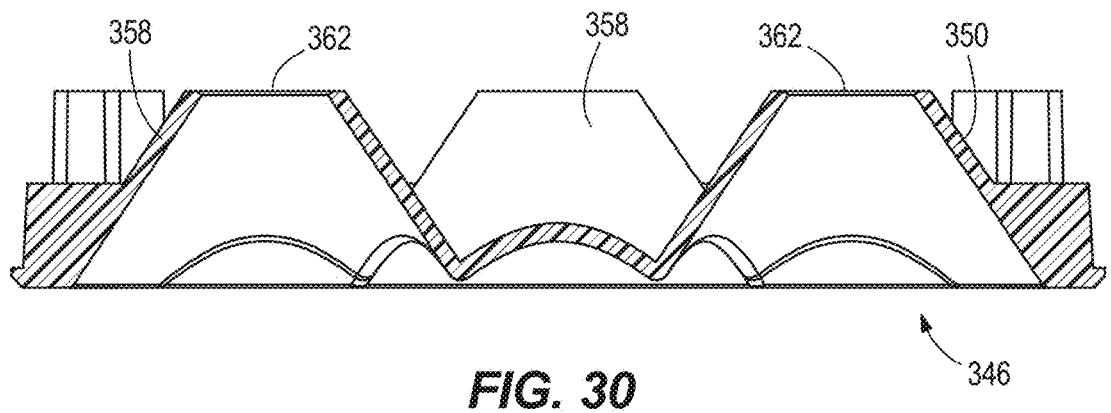
FIG. 30 is a cross-sectional view of a reflector of the light of FIG. 26.
Figure 31:
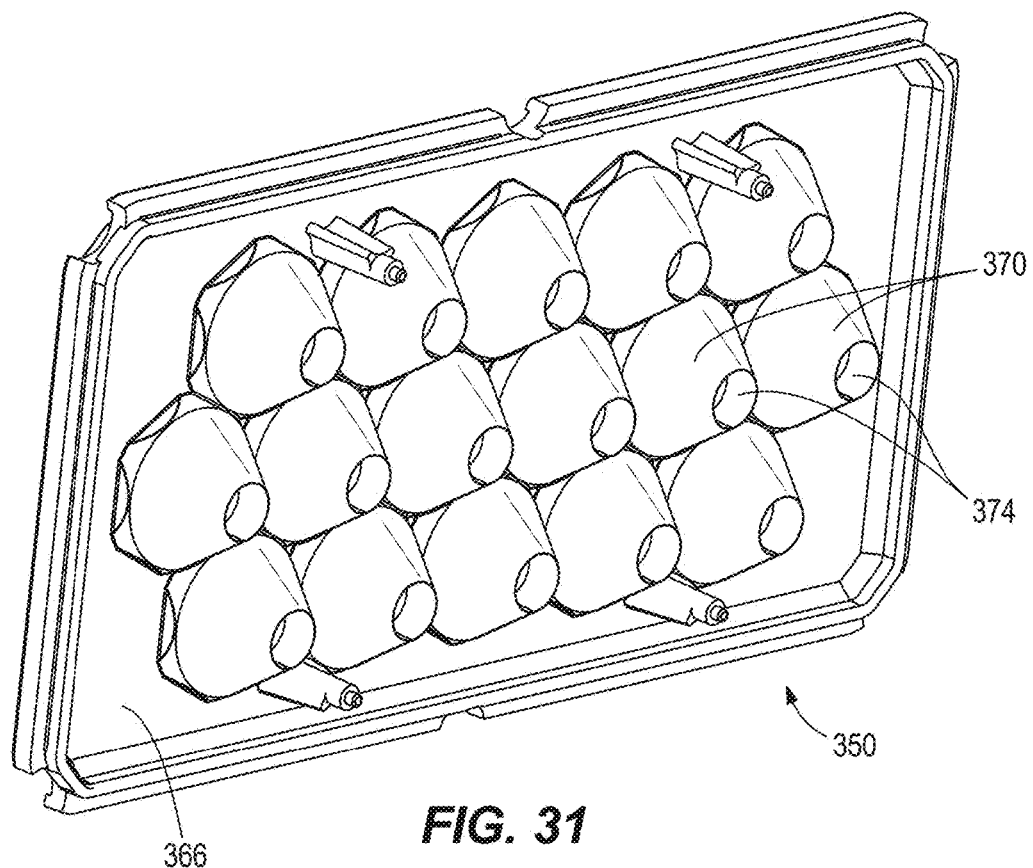
FIG. 31 is a rear perspective view of a lens of the light of FIG. 26.
Figure 32:
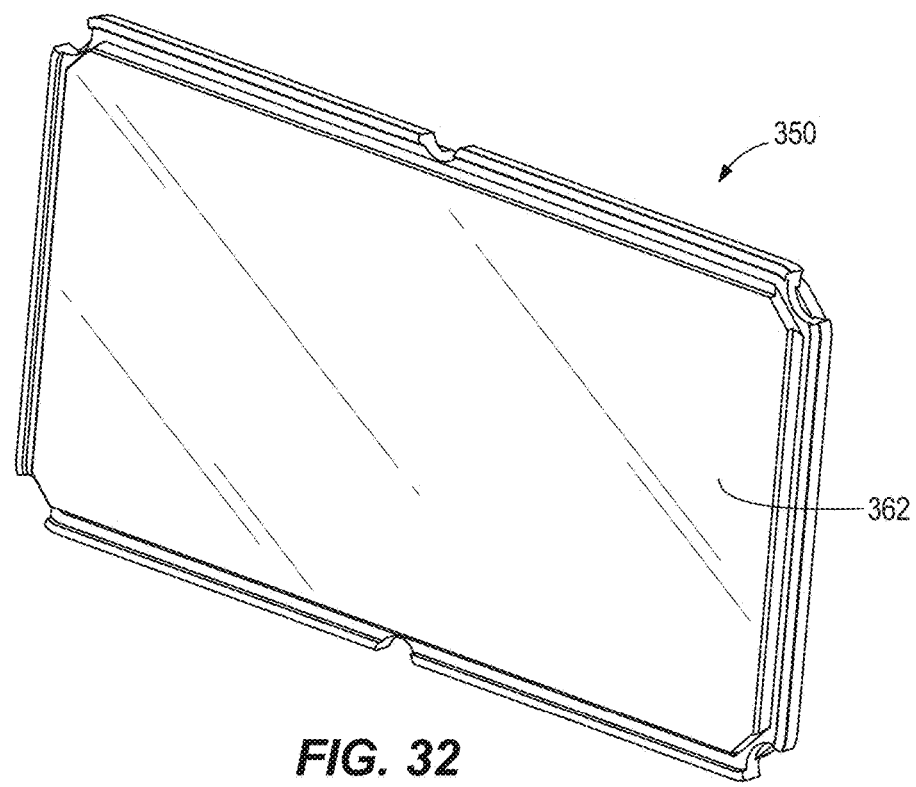
FIG. 32 is a front perspective view of a lens of the light of FIG. 26.
Figure 33:
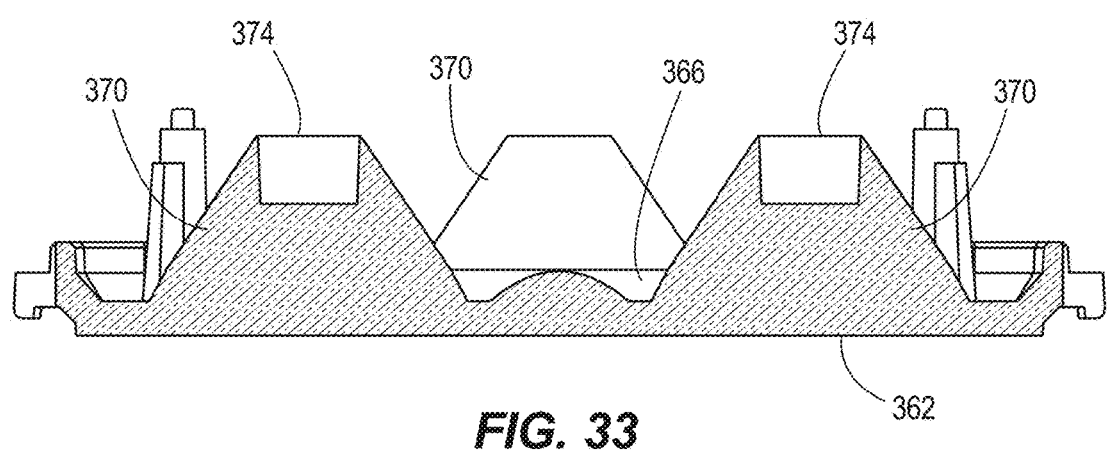
FIG. 33 is a cross-sectional view of a lens of the light of FIG. 26.

As shown in FIGS. 26-28, the light 160 includes a heat sink 330 with a plurality of fins 334. The light 160 also includes a printed circuit board (PCB) 338 with a plurality of spot light emitting diodes 342 (LEDs) and flood light LEDs 344 mounted thereon. In some embodiments the spot light LEDs 342 and flood light LEDs 344 can be controlled independently of one another, allowing independent control of flood light and spot light modes, or simultaneous use of both modes. The light further includes a reflector 346, a lens piece 350, and a cover 354 to secure the lens piece 350, the reflector 346, and the PCB 338 to the heat sink 330. In some embodiments, the reflector 346 and lens piece 350 are formed as one piece. As shown in FIGS. 29 and 30, the reflector 346 includes a plurality of cups 358 with apertures 362 to accommodate the spot light LEDs 342 and four corner pockets 364 with apertures 365 to allow passage of light from the flood light LEDs 344. As shown in FIG. 28, the cups 358 have a truncated frustoconical cross-sectional shape. As shown in FIGS. 26-28 and 31-33, the lens piece 350 has a flat, outward-facing face 362 and an opposite face 366 with a plurality of total internal reflection (TIR) lenses 370. Like the cups 358 of the reflector 346, the TIR lenses 370 of the lens piece 350 have apertures 374 to accommodate the spot light LEDs and a truncated frustoconical cross-sectional shape. In the illustrated embodiment, the TIR lenses 370 are arranged in an array of columns and rows. In the illustrated embodiment, the TIR lenses 370 are all integrally molded or formed from the same piece of material as the lens piece 350. In other embodiments, each individual TIR lens 370 may be formed separate and distinct from every other TIR lens 370.

FIGS. 35-58 illustrate seven different embodiments of alternative mounting structures of the light head 152 and the first and second bases 162, 166. For purposes of illustration, the light head 152 in the embodiments of FIGS. 35-58 is only shown being secured in the first base 162, but as described above, because the second base 166 has the same mounting structure as the first base 162, the light head 152 can also be secured in the second base 166 in a similar manner as in the first base 162.

Figure 35:
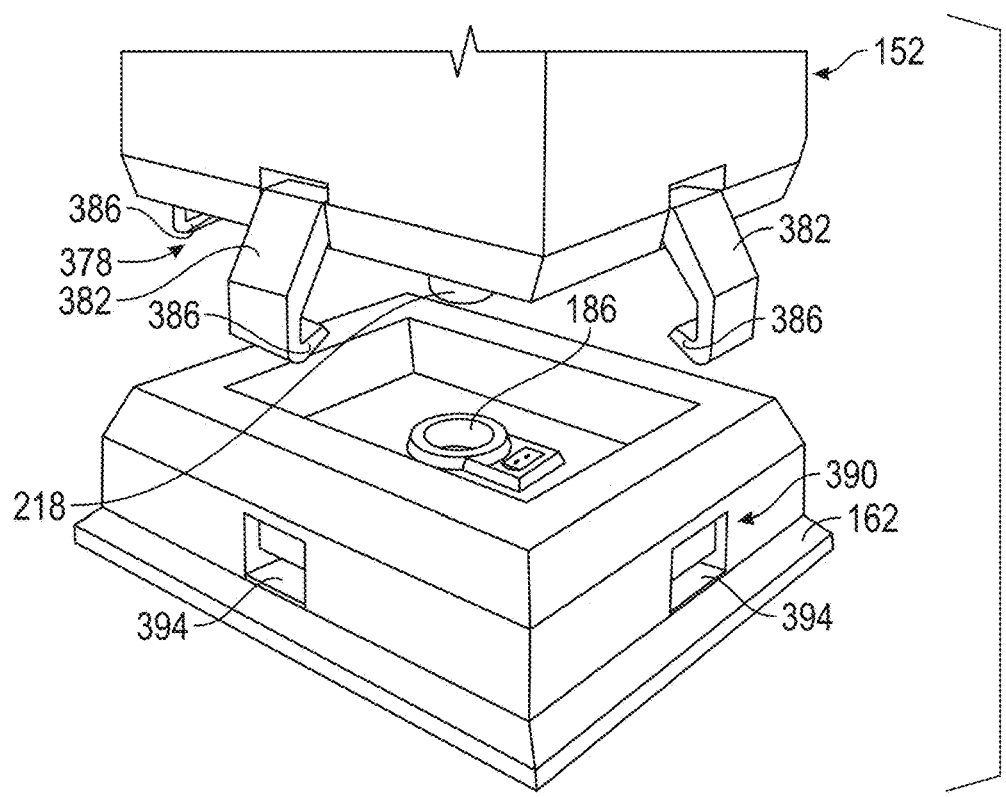
FIG. 35 is a perspective view of a different embodiment of complimentary mounting structures of a light head and a first base.
Figure 36:
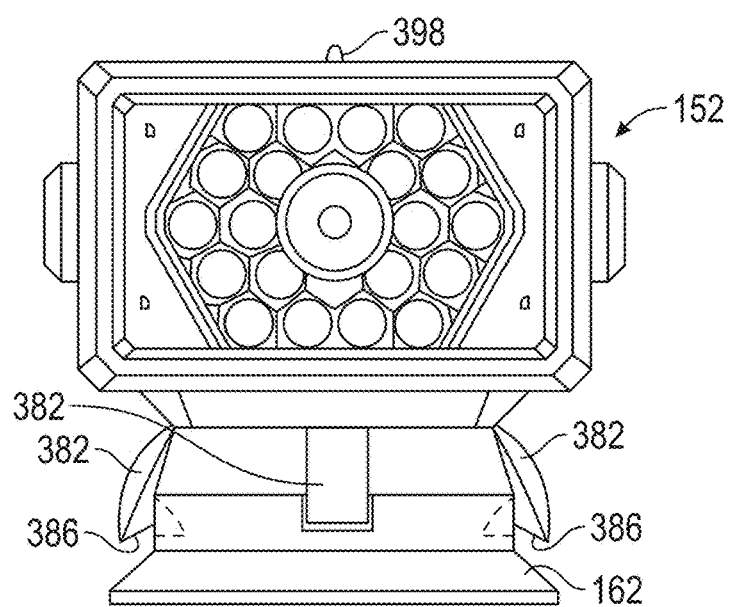
FIG. 36 is a plan view of the light head secured in the first base of FIG. 35.
Figure 37:
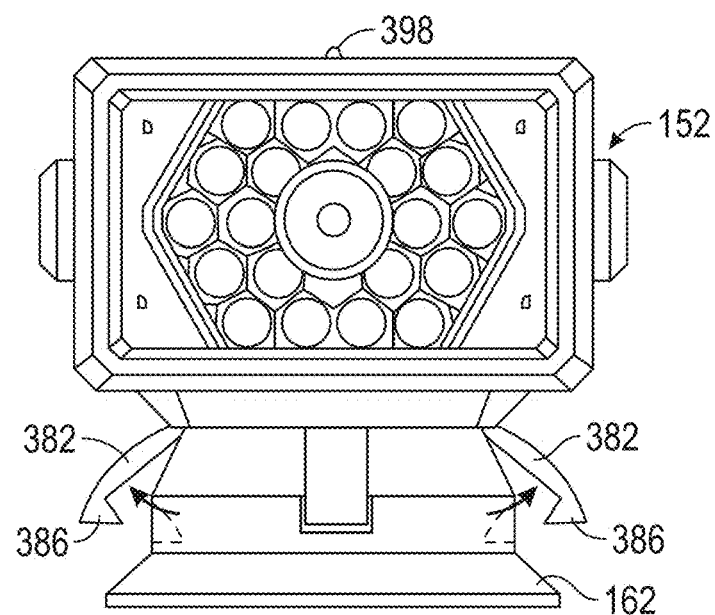
FIG. 37 is a plan view of the light head being released from the first base of FIG. 35.
Figure 38:
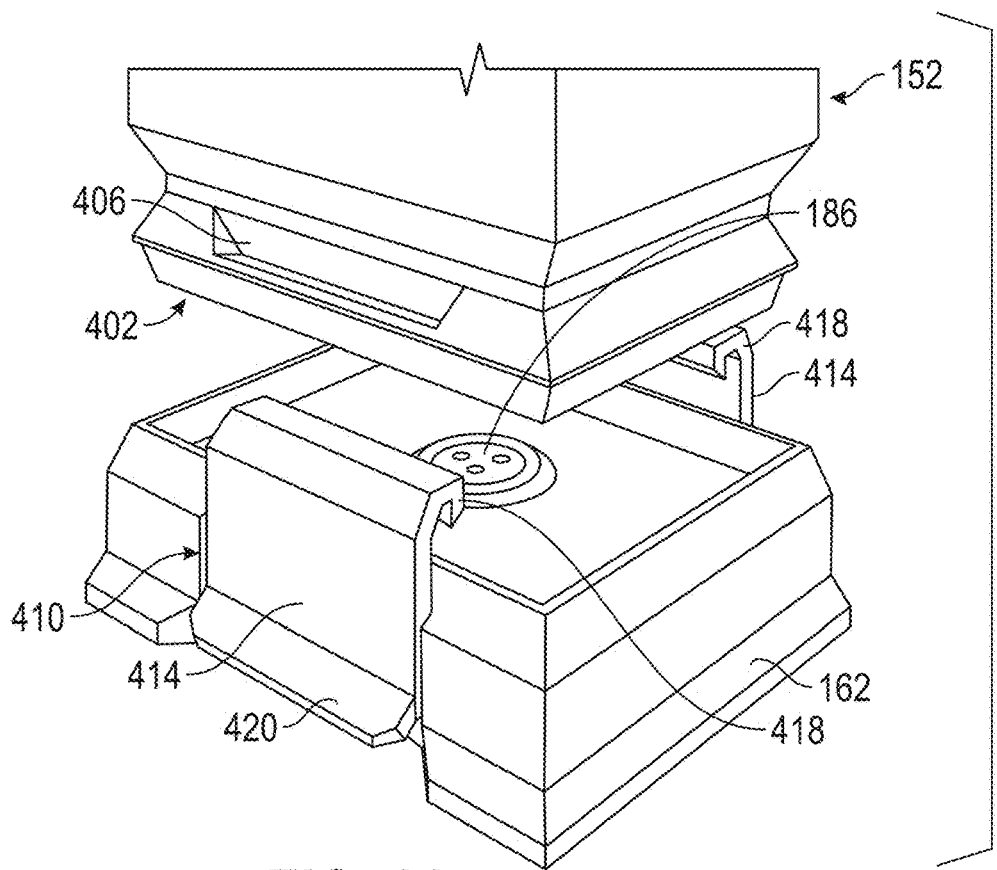
FIG. 38 is a perspective view of a different embodiment of complimentary mounting structures of a light head and a first base.

In the embodiment shown in FIGS. 35-37, the light head 152 includes a mounting structure 378 including a plurality of snap latches 382 with hooks 386 that are biased inwardly. The first base 162 includes a mounting structure 390 that includes a plurality of recesses 394 configured to catch the hooks 386 of the snap latches 382. In operation, the light head 152 is installed by pushing the light head 152 downwardly into the first base 162, causing the snap latches 382 to move outwardly along the first base 162 until the hooks 386 are biased into the recesses 394, as shown in FIG. 36, at which point the light head 152 is secured in the first base 162. To release the light head 152, an operator depresses a release actuator 398, causing the snap latches 382 to move outwardly as shown in FIG. 37, such that the hooks 386 are no longer caught in recesses 394. The operator then lifts the light head 152 away from and out of the first base 162.

Figure 39:
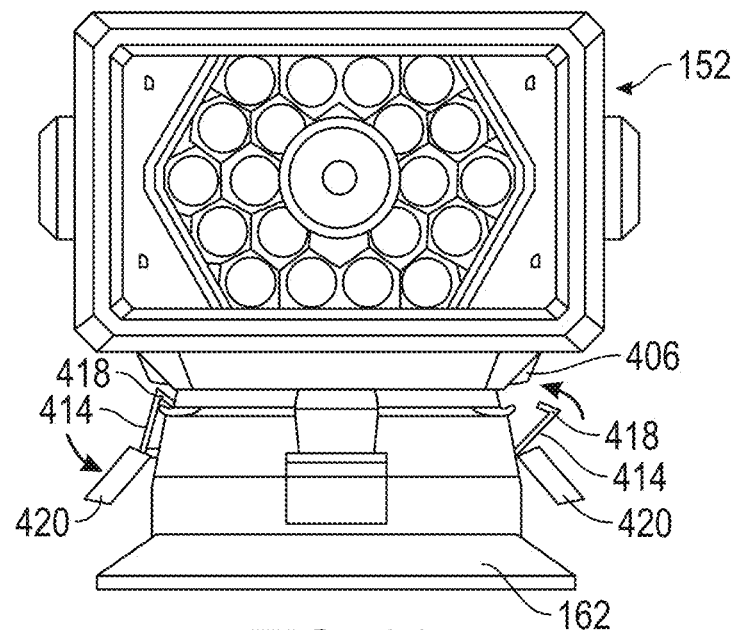
FIG. 39 is a plan view of the light head being secured in the first base of FIG. 38.
Figure 40:
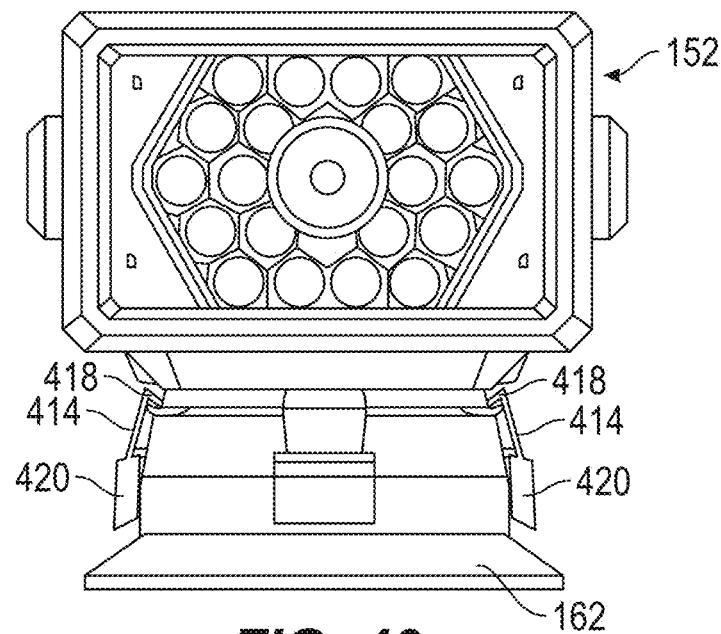
FIG. 40 is a plan view of the light head secured in the first base of FIG. 38.
Figure 41:
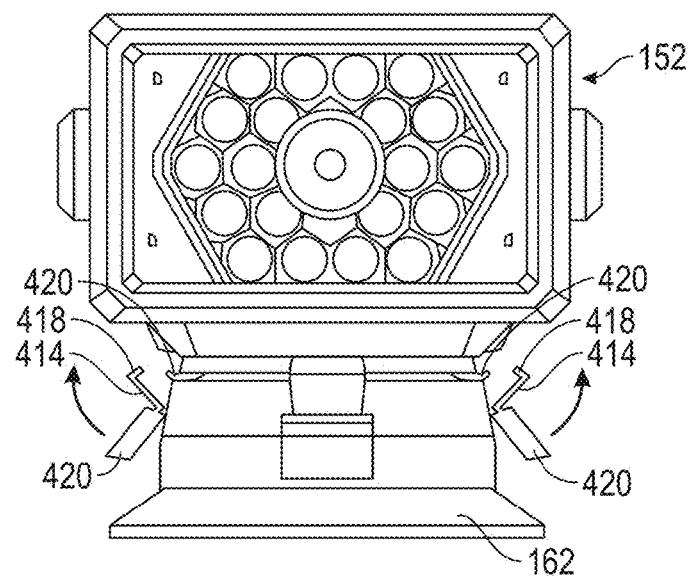
FIG. 41 is a plan view of the light head being released from the first base of FIG. 38.
Figure 42:
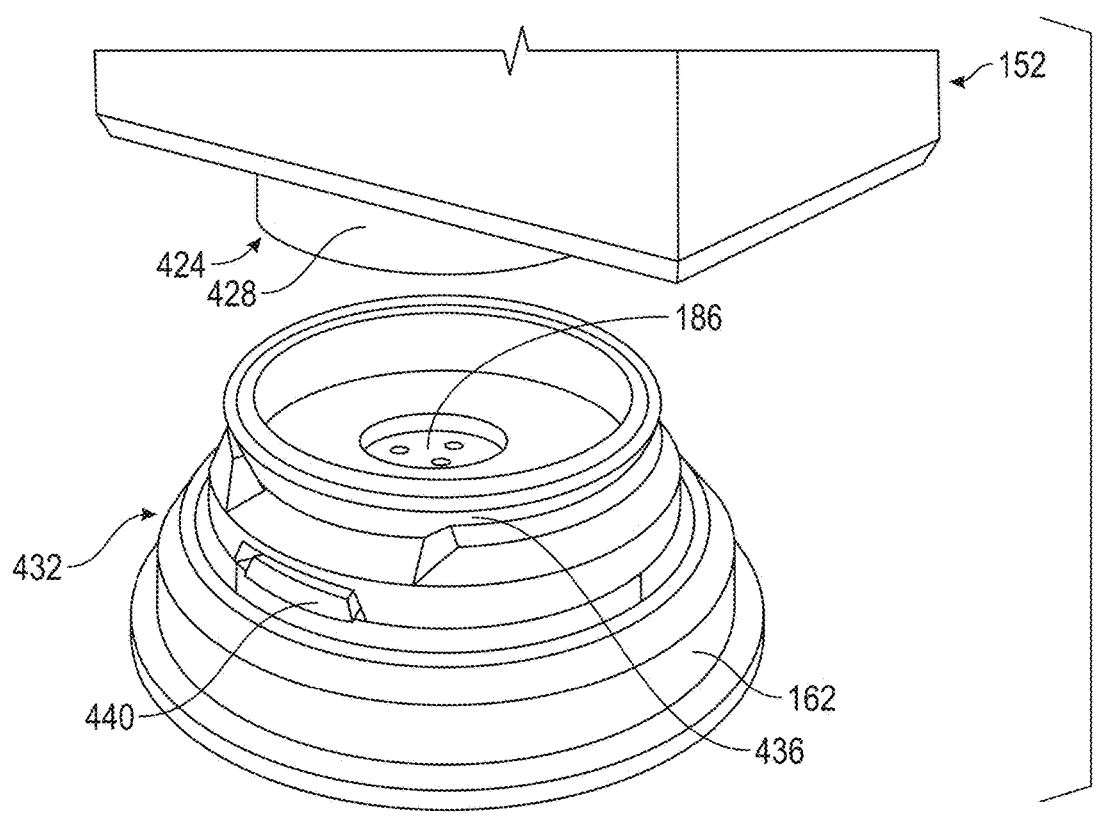
FIG. 42 is a perspective view of a different embodiment of complimentary mounting structures of a light head and a first base.

In the embodiment shown in FIGS. 38-41, the light head 152 includes a mounting structure 402 including a plurality of recesses 406. The first base 162 includes a mounting structure 410 that includes a plurality of latches 414 with hooks 418 configured to engage the recesses 406 of the mounting structure 402 and actuators 420 to pull the hooks 418 into a latched condition and release the hooks 418 from the latched condition. In some embodiments, the latches 414 are over-center full length latches. In operation, the light head 152 is installed by pushing the light head 152 into the first base 162. The operator then manually manipulates the hooks 418 of the latches 414 such that the hooks 418 engage the recesses 406 and then manipulates the actuators 420 to pull the hooks 418 tautly into the recesses 418, as shown in FIG. 39, at which point the light head 152 is secured in the first base 162, as shown in FIG. 40. To release the light head 152, an operator releases the actuators 420, thus removing the hooks 418 from the recesses 406, as shown in FIG. 41. The operator then lifts the light head 152 away from the first base 162.

Figure 43:
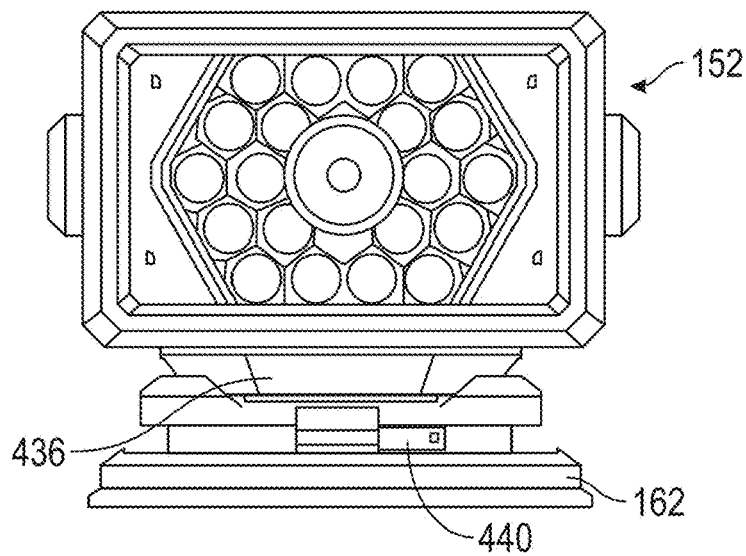
FIG. 43 is a plan view of the light head secured in the first base of FIG. 42.
Figure 44:
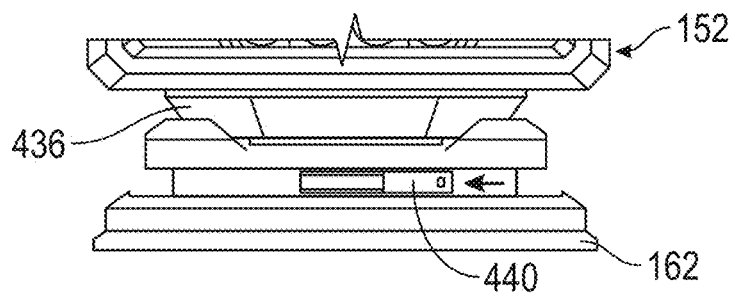
FIG. 44 is a plan view of the light head being released from the first base of FIG. 42.
Figure 45:
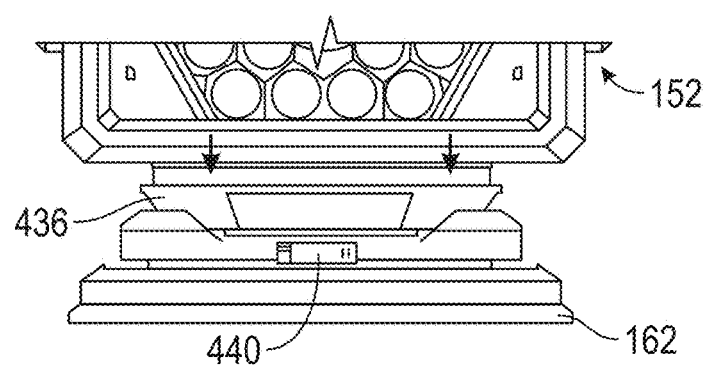
FIG. 45 is a plan view of the light head being released from the first base of FIG. 42.
Figure 46:
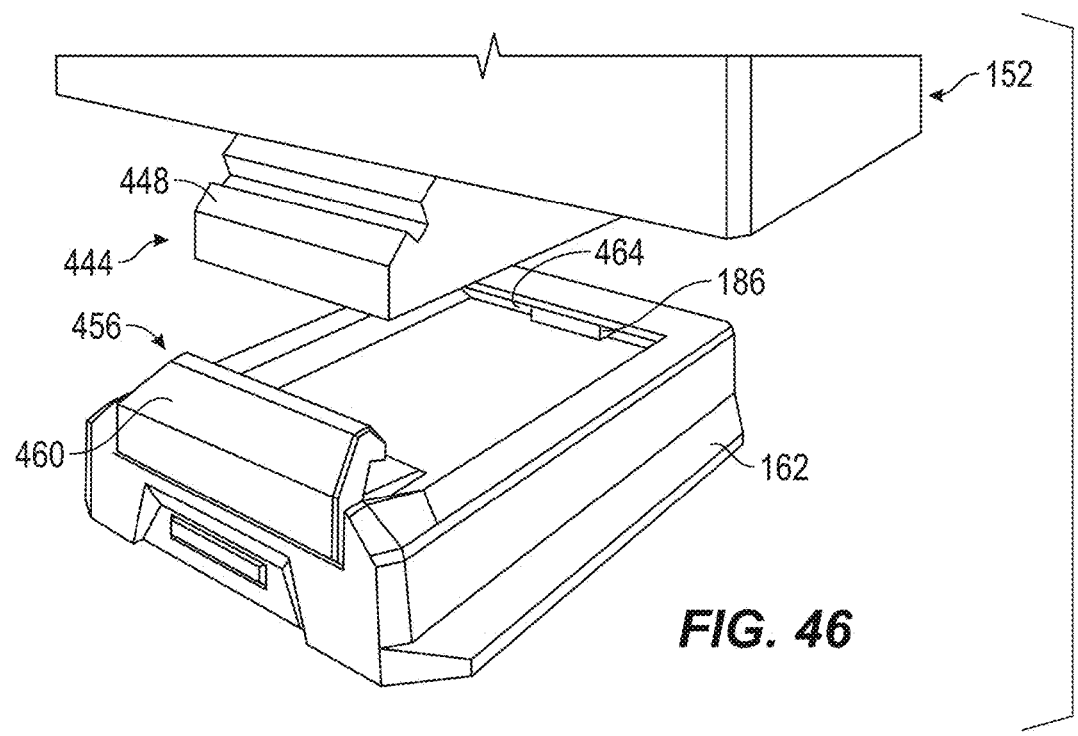
FIG. 46 is a perspective view of a different embodiment of complimentary mounting structures of a light head and a first base.

In the embodiment shown in FIGS. 42-45, the light head 152 includes a mounting structure 424 including an extension 428. The first base 162 includes a mounting structure 432 that includes a movable collar 436 that is biased away from the first base 162 to a locked position, and a slide switch 440. In operation, the light head 152 is installed into the first base 162 by pushing the extension 428 into the collar 436. The act of pushing down the light head 152 pushes the collar 436 down into an unlocked position, thus allowing the collar to receive the extension 428. Once the extension 428 is secured within the collar 436, the collar 436 is biased back to its locked position 428, as shown in FIG. 43. At this point, the light head 152 cannot be removed from the first base 162 because the extension 428 is locked by the collar 436. In order to remove the light head 152 from the first base 162, the operator first slides the slide switch 440 as indicated in FIG. 44, thus allowing the collar 436 to be moved to the unlocked position. The operator then pulls the collar 436 down to the unlocked position, as indicated in FIG. 45. While holding the collar 436 in the unlocked position, the operator then pulls the light head 152 away from the first base 162.

Figure 47:
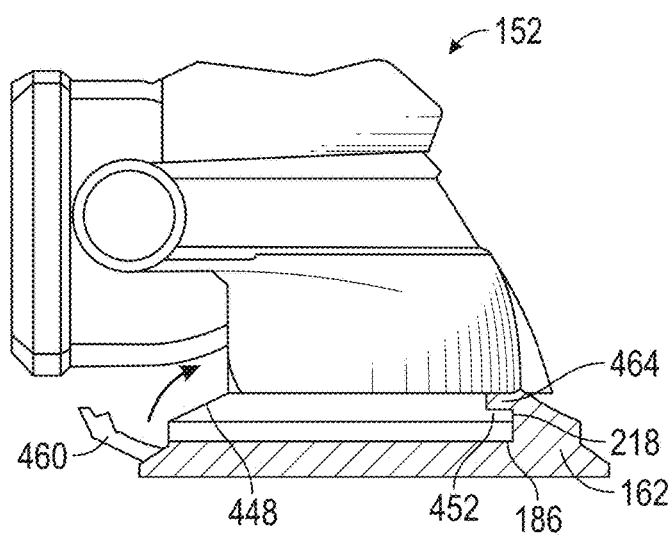
FIG. 47 is a plan view of the light head being secured in the first base of FIG. 46.
Figure 48:
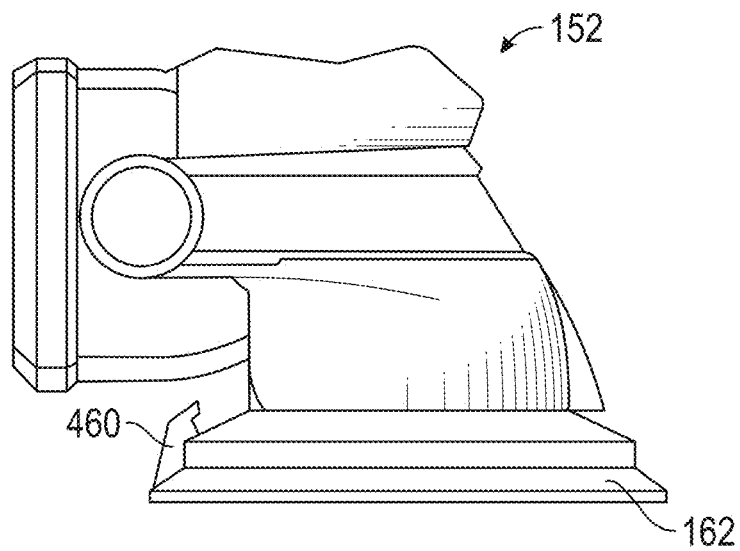
FIG. 48 is a plan view of the light head secured in the first base of FIG. 46.
Figure 49:
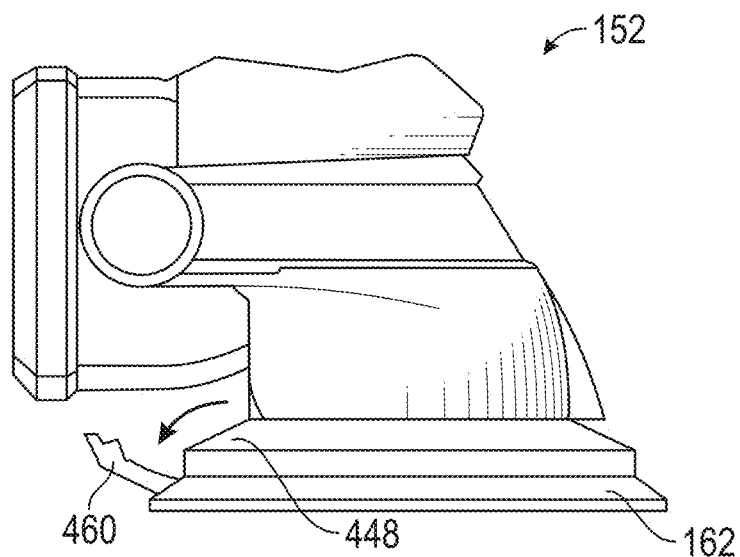
FIG. 49 is a plan view of the light head being released from the first base of FIG. 46.

In the embodiment shown in FIGS. 46-49, the light head 152 includes a mounting structure 444 with a first lip 448 and a second opposite lip 452 having the terminal 218. The first base 162 has a mounting structure 456 having a latch 460 and a recess 464 with the terminal 186. In operation, the light head 152 is installed into by inserting the sliding the second lip 452 toward and into the recess 464, such that the terminals 186, 218 mate. The latch 460 is then swung up to secure the first lip 448, as shown in FIG. 47. The light head 152 is now secured in the first base 152, as shown in FIG. 48, with the mounting structures 444, 456 mating like a ski boot attaches to a ski. To release the light head 152, the latch 460 is swung away from the first lip 448, as shown in FIG. 49, and the second lip 452 is slid out of the recess 464.

Figure 50:
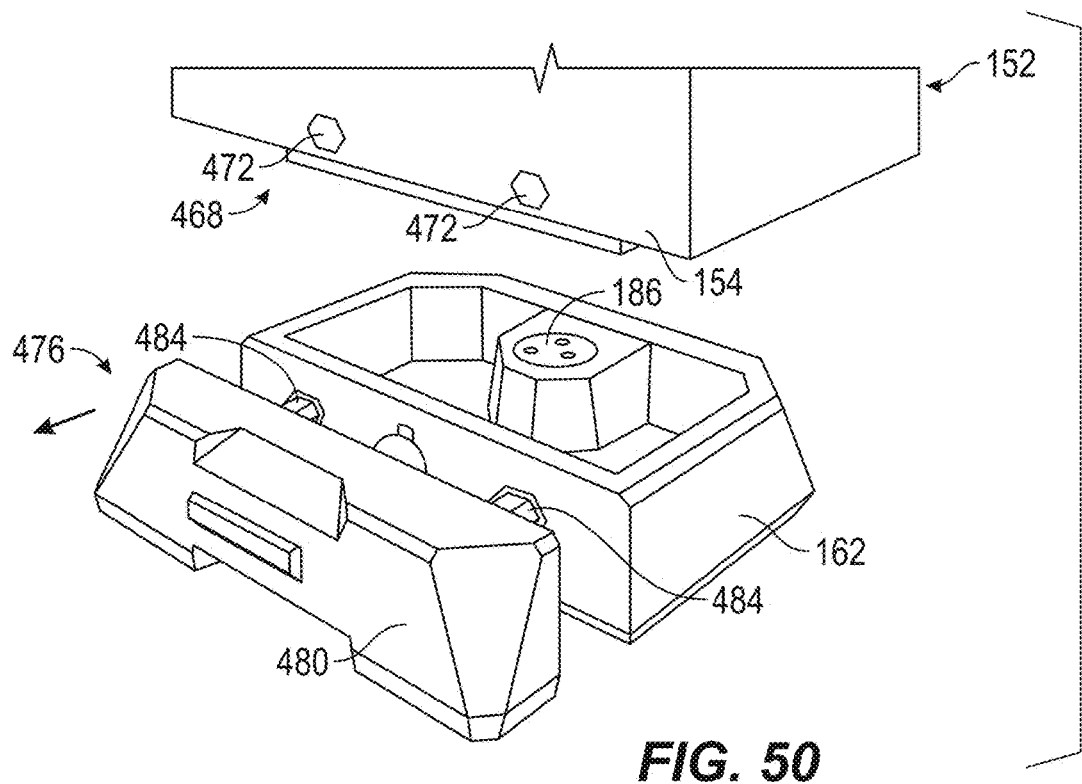
FIG. 50 is a perspective view of a different embodiment of complimentary mounting structures of a light head and a first base.
Figure 51:
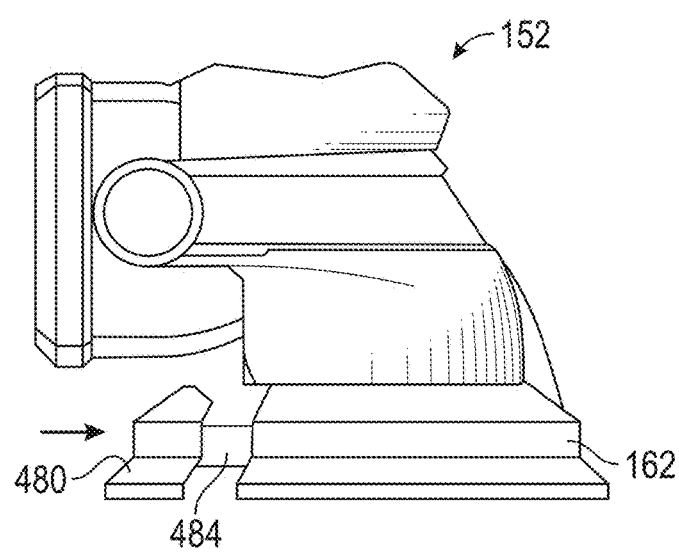
FIG. 51 is a plan view of the light head being secured in the first base of FIG. 50.
Figure 52:
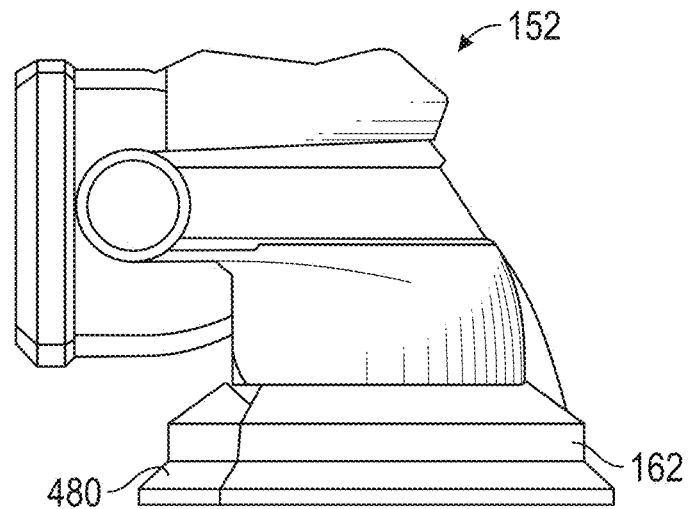
FIG. 52 is a plan view of the light head secured in the first base of FIG. 50.
Figure 53:
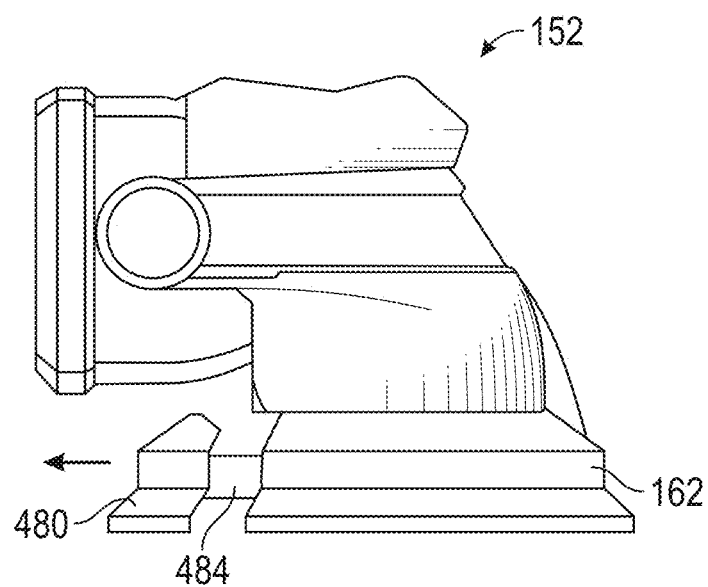
FIG. 53 is a plan view of the light head being released from the first base of FIG. 50.

In the embodiment shown in FIGS. 50-53, the light head 152 includes a mounting structure 468 with apertures 472 in the base 154. The first base 162 has a mounting structure 476 having a slideable shelf 480 coupled to the first base 162 by two bolts 484 that extend into a recess 488 of the first base 162 when the shelf 480 abuts the first base 162 in a locked position. In some embodiments, the bolts 484 are dead bolts. In operation, to install the light head 152, the shelf 480 is first slid away from the first base 162 to an unlocked position, as shown in FIG. 50, resulting in the bolts 484 exiting recess 488. The operator may now move the base 154 of the light head 152 into the recess 488, such that the apertures 472 are aligned with the bolts 484. The operator then moves the shelf 480 towards the locked position, as shown in FIG. 51. Once the shelf 480 abuts the first base 162 in the locked position as shown in FIG. 52, the bolts 484 are received in the apertures 472, thus securing the light head 152 to the first base 162. In order to remove the light head 152, the shelf 480 is slid outwardly to the unlocked position as shown in FIG. 53, thus removing the bolts 484 from the apertures 472. The operator then lifts the light head 152 out of the first base 162.

Figure 54:
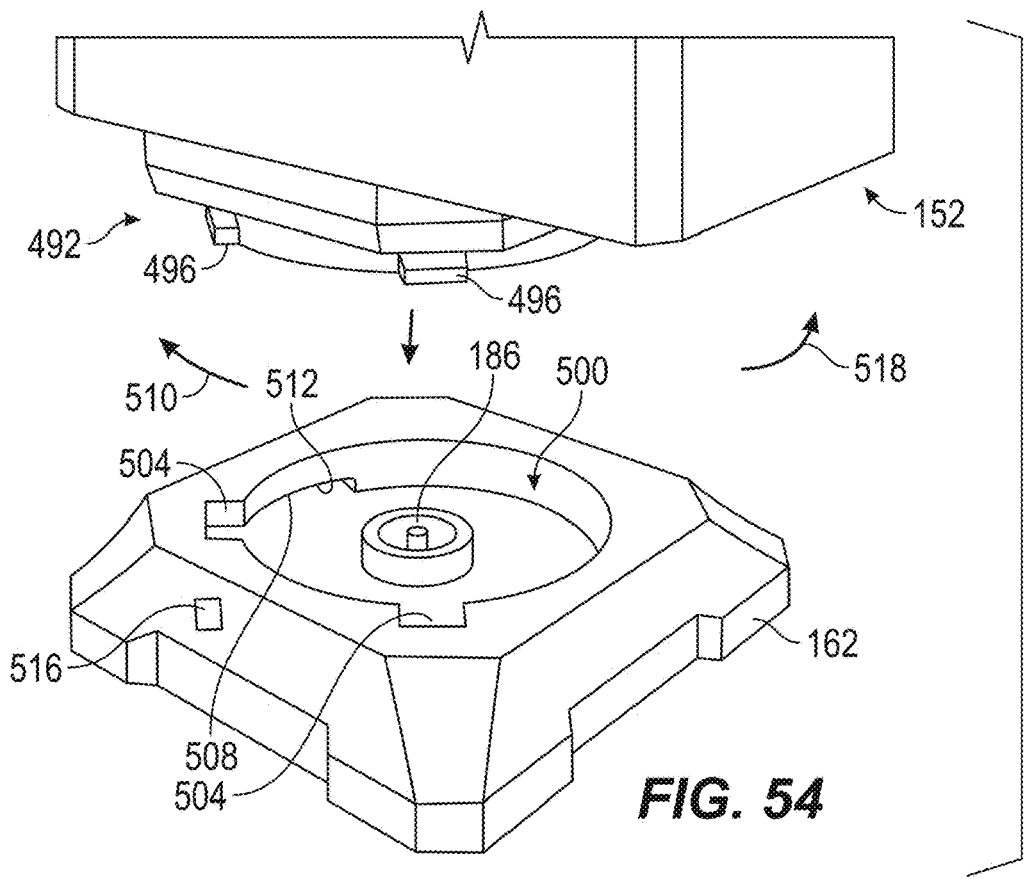
FIG. 54 is a perspective view of a different embodiment of complimentary mounting structures of a light head and a first base.
Figure 55:
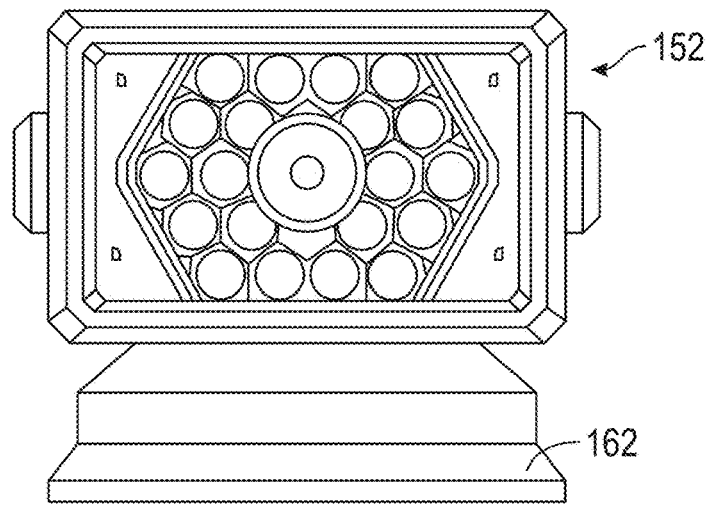
FIG. 55 is a plan view of the light head secured in the first base of FIG. 54.

In the embodiment shown in FIGS. 54 and 55, the light head 152 includes a mounting structure 492 with a pair of radially outward extending pegs 496. The first base 162 includes a mounting structure 500 with a pair of radially outward extending recesses 504 at a first height and a pair of adjoining, circumferential slots 508 at a second, lower height. In order to install the light head 152, the operator pushes the light head 152 into the first base 162, aligning the pegs 496 with the recesses 504. Once the pegs 496 have moved through the recesses 504 and into the circumferential slots 508, the operator rotates the light head 152 in a first direction 510 (clockwise as viewed in FIG. 54), such that the pegs 496 become caught under an upper ceiling 512 of the slots 508. The operator continues rotating the light head 152 until the base 154 snaps into engagement with a lock in the first base 162. The light head 152 is now secured to the first base 162, as shown in FIG. 55. To remove the light head 152, the operator presses a release actuator 516, which disengages the lock in the first base 162. The operator may now rotate the light head 152 a second opposite direction 518 (counterclockwise as viewed in FIG. 54) until the pegs 496 are aligned with the recesses 504, at which point the light head 152 may be lifted out of the first base 162.

Figure 56:
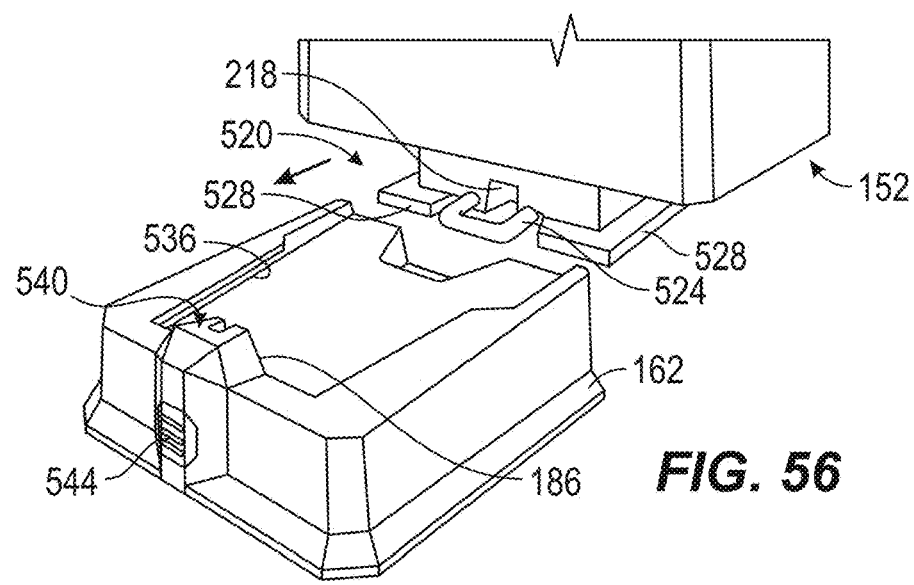
FIG. 56 is a perspective view of a different embodiment of complimentary mounting structures of a light head and a first base.
Figure 57:
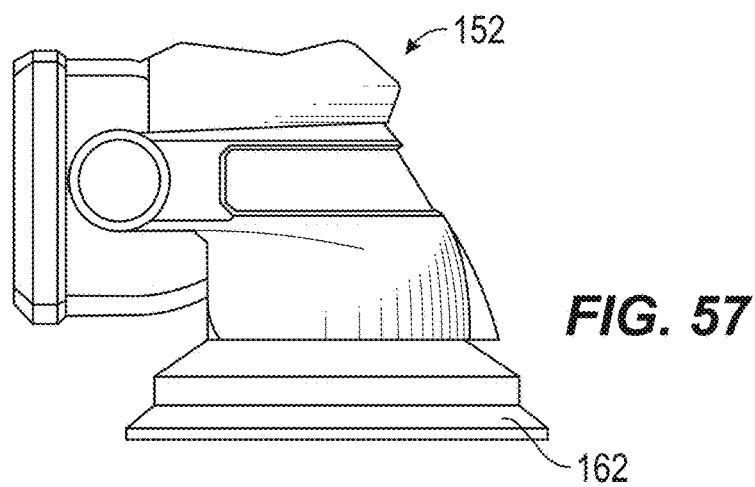
FIG. 57 is a plan view of the light head secured in the first base of FIG. 56.
Figure 58:
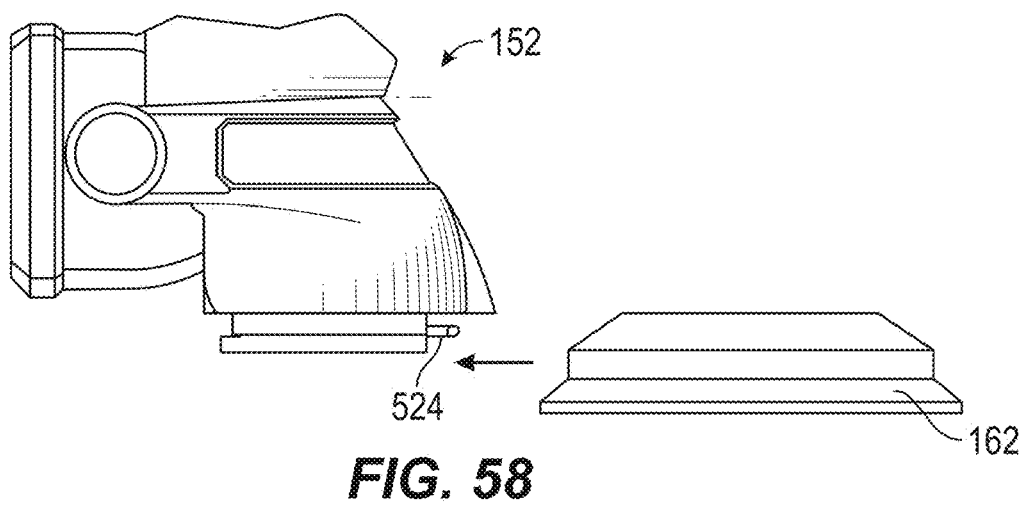
FIG. 58 is a plan view of the light head being removed from the first base of FIG. 56.

In the embodiment shown in FIGS. 56-58, the light head 152 includes a mounting structure 520 that includes a bar 524 and a pair of rails 528 and the first base 162 includes a mounting structure 532 that includes a pair of grooves 536 and a latch mechanism 540. In order to install the light head 152, the light head 152 is slid into the first base 162 as shown in FIG. 56, while, aligning the rails 528 into the grooves 536. Once slid in, the latch mechanism 540 engages the bar 524, thereby inhibiting removal of the light head 152 from the first base 162, as shown in FIG. 57. In order to remove the light head 152, the operator depresses a release actuator 544, which disengages the latch mechanism 540 from the bar 524 and allows the light head 152 to be slid out of the first base 162, as shown in FIG. 58.

Various features of the invention are set forth in the following claims.

What is claimed is:

1. A light assembly for attachment to a surface of a vehicle, the vehicle having a power source, the light assembly comprising:
   a light head including
      a light,
      a light head terminal in electrical communication with the light, and
      a first mounting structure;
   a first base configured to be coupled to the surface of the vehicle, the first base including
      a second mounting structure configured to mate with the first mounting structure such that the light head can be removably secured on the first base,
      a conductor configured to couple to the power source of the vehicle, and
      a first base terminal in electrical communication with the conductor and configured to mate with the light head terminal to provide power to the light when the light head is secured on the first base; and
   a second base configured to be coupled to the surface of the vehicle, the second base being different than the first base, the second base including
      a third mounting structure configured to mate with the first mounting structure such that the light head can be removably secured on the second base,
      a battery, and
      a second base terminal in electrical communication with the battery and configured to mate with the light head terminal to provide power to the light when the light head is secured on the second base.

2. The light assembly of claim 1, wherein the light includes a plurality of light emitting diodes and a lens, and wherein the lens has a plurality of total internal reflection lenses.

3. The light assembly of claim 1, wherein the first base is secured to the surface of the vehicle, and wherein the second base is removable from the surface of the vehicle without the use of tools.

4. The light assembly of claim 3, wherein the first base includes a fastener configured to couple the second base to the vehicle.

5. The light assembly of claim 3, wherein the second base includes a magnet configured to couple the first base to the vehicle.

6. The light assembly of claim 1, wherein the second mounting structure and the third mounting structure are similar.

7. The light assembly of claim 1, wherein the light is rotatable relative to the first mounting structure about a first axis and a second axis that is different than the first axis.

8. The light assembly of claim 7, wherein the light includes a flood light mode and a spot light mode, and wherein the light assembly further comprises a remote to wirelessly control rotation of the light about the first and second axes and to control operation of the flood light mode and the spot light mode.

9. A light assembly for attachment to a surface of a vehicle, the light assembly comprising:
   a light head including
      a light;
      a light head terminal in electrical communication with the light, and
      a first mounting structure; and
   a vehicle base configured to be removably coupled to the surface of the vehicle, the vehicle base including
      a second structure configured to mate with the first mounting structure such that the light head can be removably secured on the vehicle base,
      a base terminal configured to mate with the terminal of the light head to provide power to the light when the light head is secured on the vehicle base;
   wherein the light is rotatable relative to the vehicle base about a first axis and about a second axis that is different from the first axis while secured on the vehicle base.

10. The light assembly of claim 9, wherein the light includes a plurality of light emitting diodes and a lens, and wherein the lens has a plurality of total internal reflection lenses.

11. The light assembly of claim 9, wherein the light head includes a light head base and a yoke, wherein the light is rotatable relative to the yoke about the first axis, and wherein the yoke is rotatable relative to the light head base about the second axis.

12. The light assembly of claim 9, wherein the vehicle base includes a battery in electrical communication with the base terminal to provide power to the light while the light head is secured on the vehicle base.

13. The light assembly of claim 9, wherein the vehicle base includes a conductor in electrical communication with the base terminal and configured to couple to a power source of the vehicle to provide power to the light while the light head is secured on the vehicle base.

14. The light assembly of claim 9, wherein the first mounting structure includes a rail and the second mounting structure includes a groove that receives the rail to secure the light head on the vehicle base.

15. The light assembly of claim 14, wherein the first mounting structure includes a release actuator having latch portion and being a moveable between a latched position and an unlatched position, and wherein the second mounting structure includes a shoulder configured to engage the latch portion when the light head is on the vehicle base and the latch portion is in the latched position, such that the light head is inhibited from moving away from the vehicle base.

16. A light assembly for attachment to a surface of a vehicle, the light assembly comprising:
   a light head including
      a light including a plurality of light emitting diodes and a lens, the lens having a plurality of total internal reflection lenses;
      a light head terminal in electrical communication with the light, and
      a first mounting structure; and
   a vehicle base configured to be coupled to the surface of the vehicle, the vehicle base including
      a second structure configured to mate with the first mounting structure such that the light head can be removably secured on the vehicle base,
      a base terminal configured to mate with the terminal of the light head to provide power to the light when the light head is secured on the vehicle base.

17. The light assembly of claim 16, wherein each total internal reflection lens has a truncated frustoconical cross-sectional shape.

18. The light assembly of claim 16, wherein all of the plurality of total internal reflection lenses are integrally molded as part of the lens.

19. The light assembly of claim 16, wherein the light head includes a light head base and a yoke, wherein the light is rotatable relative to the yoke about a first axis, and wherein the yoke is rotatable relative to the light head base about a second axis that is different from the first axis.

20. The light assembly of claim 16, wherein the plurality of total internal reflection lenses is arranged in an array of rows.

* * * * *